(12) United States Patent
Ross

(10) Patent No.: US 12,182,535 B2
(45) Date of Patent: Dec. 31, 2024

(54) HIGH CLOCK-EFFICIENCY RANDOM NUMBER GENERATION SYSTEM AND METHOD

(71) Applicant: CASSY HOLDINGS LLC, South Jordan, UT (US)

(72) Inventor: Patrick D. Ross, South Jordan, UT (US)

(73) Assignee: CASSY HOLDINGS LLC

( * ) Notice: Subject to any disclaimer, the term of this patent is extended or adjusted under 35 U.S.C. 154(b) by 0 days.

(21) Appl. No.: 18/104,438

(22) Filed: Feb. 1, 2023

(65) Prior Publication Data

US 2023/0273772 A1    Aug. 31, 2023

Related U.S. Application Data

(60) Provisional application No. 63/306,073, filed on Feb. 2, 2022.

(51) Int. Cl.
*G06F 7/58* (2006.01)
(52) U.S. Cl.
CPC ................... *G06F 7/582* (2013.01)
(58) Field of Classification Search
CPC ............. G06F 7/58–588; G06F 7/726; G06F 2207/581; G06F 2207/583
USPC .............................................. 708/250–256
See application file for complete search history.

(56) References Cited

U.S. PATENT DOCUMENTS

| | | | |
|---|---|---|---|
| 6,728,740 B2 | 4/2004 | Kelly et al. | |
| 6,954,770 B1 | 10/2005 | Carlson et al. | |
| 7,170,997 B2 | 1/2007 | Petersen et al. | |
| 7,827,223 B2 | 11/2010 | Gressel et al. | |
| 8,229,108 B2 | 7/2012 | Wan et al. | |
| 9,207,911 B2 | 12/2015 | Ross | |
| 9,391,770 B2 | 7/2016 | Leidich et al. | |
| 11,294,640 B2 | 4/2022 | Shao et al. | |
| 2002/0154769 A1* | 10/2002 | Petersen | G06F 7/586 380/42 |
| 2004/0205095 A1 | 10/2004 | Gressel et al. | |
| 2005/0036607 A1 | 2/2005 | Wan et al. | |

(Continued)

OTHER PUBLICATIONS https://www.merriam-webster.com/dictionary/adjacent (Year: 2022).*

(Continued)

*Primary Examiner* — Emily E Larocque
(74) *Attorney, Agent, or Firm* — Jason P. Webb; Pearson Butler

(57) ABSTRACT

A system and method for aggregating data and for generating a stream of random numbers. There is a data bus, having a bus input with first and second output switching inputs that each mask values input thereto such that data from both the first and second output switching inputs are aggregated into the bus according to the masking thereof, and a bus output. There is also a data loop of random numbers having a data loop output port functionally coupled to the bus input through the first output switching input; a data feed having an output functionally coupled to the bus input through the second output switching input; and an active data operator coupled to the bus output such that data aggregated by the bus from the data loop and the first data feed is fed to the data operator, the output thereof being a stream of random numbers.

20 Claims, 14 Drawing Sheets

(56) References Cited

U.S. PATENT DOCUMENTS

| | | | | |
|---|---|---|---|---|
| 2007/0244951 A1* | 10/2007 | Gressel | .................... | H04L 9/12 |
| | | | | 708/252 |
| 2011/0029588 A1* | 2/2011 | Ross | ........................ | G06F 7/58 |
| | | | | 708/250 |
| 2015/0172045 A1* | 6/2015 | Leidich | ................ | H04L 9/0643 |
| | | | | 380/281 |
| 2020/0293287 A1* | 9/2020 | Shao | ....................... | G06F 7/588 |

OTHER PUBLICATIONS www.dictionary.com/browse/adjacent (Year: 2022).*
Universal Shift Register in Digital Logic, GeeksforGeeks (Year: 2019).*

* cited by examiner

HIGH CLOCK-EFFICIENCY RANDOM NUMBER GENERATION SYSTEM AND METHOD

CROSS-REFERENCE TO RELATED APPLICATIONS

This invention claims priority, under 35 U.S.C. § 120, to the U.S. Provisional Patent Application No. 63/306,073 to Patrick D. Ross filed on Feb. 2, 2022, which is incorporated by reference herein in its entirety.

BACKGROUND OF THE INVENTION

Field of the Invention

The present invention relates to methods and systems for generating random numbers, specifically to computer-generated random numbers.

Description of the Related Art

Computing systems and operations are sometimes required to produce and/or utilize random or pseudorandom numbers (deterministic numbers that seem to be random but are not actually random) for various purposes, including but not limited to gaming, simulation, modeling, security, seeding, and the like and combinations thereof. Random and pseudorandom number streams come in varying qualities of randomness and some applications of their use require minimum standards of quality. The NIST Special Publication 800-22 is an example of a body of standards for random and pseudorandom number generators and it includes methods for testing streams of numbers for randomness, unpredictability, etc. including 15 different tests for various types of non-randomness. Various sources of random/pseudorandom number streams will produce streams of particular qualities and high quality streams are often particularly difficult/expensive to produce and/or produce with reliable/consistent quality.

Examples of physical sources of random number streams include noise in an electronical circuit, spontaneous decay of radioactive nuclei, date/time vectors, mouse movements, delay between keyboard presses, and combinations thereof. Examples of sources of pseudorandom number streams include seeded PRNG functions (e.g. Middle-square method, Lehmer generator, Linear Congruential Generator (LCG), Linear Feedback Shift Register (LFSR), Non-linear feedback shift registers, Inversive Congruential Generator (ICG)), cipher algorithms, cryptographic hashes, and combinations thereof (including some incredibly complicated combinations).

In the related art, it has been known to use computing systems to produce on-demand streams of random/pseudorandom numbers. Various hardware, software, and hybrid systems have been developed in order to service the need for random value streams. Some improvements have been made in the field. Examples of references related to the present invention are described below in their own words, and the supporting teachings of each reference are incorporated by reference herein:

Chinese Patent Application No. CN101515228A, entitled TRUE RANDOM NUMBER GENERATOR, teaches a true random number generator, comprising a stochastic source module and a post-processing module. The stochastic source module is used for generating digital signals having random characteristics and providing the digital signals for the post-processing module; the post-processing module carries out post-processing for the digital signals by using a loop code error-correcting method, thereby eliminating bias of data signals to obtain random number series. The stochastic source module can be composed of a plurality of sets of inverter oscillating rings, and the post-processing module is realized by a linear feedback shift register (LFSR). The TRNG (True Random Number Generator) has simple structure and only general digital logic devices are used, so the true random number generator has good technology weak correlation and can be rapidly transplanted in an integrated circuit design flow after prototype verification is carried out, thereby improving the efficiency of module design and reducing the development risk.

U.S. Pat. No. 6,954,770 issued to Carlson et al., discloses a random number generator comprising an oscillator with an output signal dependant upon a random source, a sampling device to sample the output signal from the oscillator to obtain a sampled oscillator output, and a fixed frequency clock driven linear feedback shift register (LFSR) communicatively coupled to the sampling device via a digital gate to receive the sampled oscillator output, and to provide a random number at an output of the LFSR. Additionally, the random number generator may comprise an optional mixing function communicatively coupled to the LFSR to read the random number, and to insert the random number into an algorithm to obtain a robust random number.

U.S. Patent Application Publication No. 20050036607 by Wan et al., discloses a method of generating pseudo-random numbers is performed by sampling output sequences of a linear feedback shift register with a specified periodicity. In one embodiment, the generating of pseudo-random numbers using linear feedback shift registers is accomplished by periodically switching between iterative outputs generated by multiple linear feedback shift registers. In one embodiment, a method of encrypting a pseudo-random number generated by a linear feedback shift register comprises using a nonlinear operator. In one embodiment, a method of further encrypting a pseudo-random number is accomplished by using a hashing function whose initial value varies over time by way of a function operating on one or more variables. In one embodiment, an apparatus for generating pseudo-random numbers using linear feedback shift registers comprises a digital hardware.

The inventions heretofore known suffer from a number of disadvantages which include being slow, being inefficient, degrading or not maintaining a quality standard for randomness, having an exponentially increasing cost for additional random values beyond an initial generation cycle, requiring many clock cycles to produce a random value, producing deterministic values, and failing to produce actual random streams.

What is needed is a method and/or system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available methods and systems for generating random numbers. Accordingly, the present invention has been developed to provide a system and/or method of generating random numbers.

According to one non-limiting embodiment, there is a method of quickly and efficiently generating a series of random numbers from a source of random numbers in a computing system. The method includes one or more of the steps of: loading a data loop with random data that may be from a source of random data, the data loop including one or more of: a looped array of stored values; and an index; reading a value that may be multi-bit from the data loop in relation to a location of the index within the looped array; performing a first data operation on the value thereby deriving a derived random number from the multi-bit value; moving the index in relation to the looped array to a different location within the looped array; and/or repeating one or more of these steps, thereby generating a series of derived random numbers.

It may be that the data loop is a shift register. The shift register may be a universal shift register. It may be that the different location is an adjacent location. It may be that the data operation is a decoupling operation which may be selected from the group consisting of: XOR, Mask Generator, Data MUX, and MOD. It may be that the source of random data is the output of one or more methods/steps described herein. It may be that the step of loading the data loop is performed by a direct memory access. It may be that the data operation is a MOD operation performed with the multi-bit value as the numerator and a denominator having fewer bits than the multi-bit value. It may be that the denominator is a value obtained from, directly or derived, from the source of random data. It may be that the denominator is larger than a desired range of the derived random number. It may be that the controller includes one or more of: a programmable logic circuit, a script, and a driver.

There may be a step of automatically selecting the decoupling operation from a plurality of decoupling operations according to a controller. There may be a step of, contemporaneously with the step of performing a first data operation, performing a second data operation on the multi-bit value thereby deriving a second derived random number from the multi-bit value. Further, It may be that a second/ secondary computing system independently performs one or more steps described herein using a substantially identical source of random data as a primary computing system such that the data loop of the second computing system loads identically to a data loop of a primary system and substantially identical data operation therewith such that resulting derived random numbers are the same as those derived by a primary system/method, thereby generating a second series of derived random numbers that is identical to the series of derived random numbers of the primary system.

It may be that the second computing system is structurally different from the primary computing system in at least one of type of: data loop, read operator, shifter, controller type, and data loop loader.

In another non-limiting embodiment, there may be a computerized system for efficiently generating a stream of random numbers. The system may include one or more of: a data loop, including one or more of: a simple-feedback looped array of random data; an index; and/or an output port that reads values from the simple-feedback looped array that may be based on a relative location of the index with respect to the simple-feedback looped array; a data operator, having one or more of: an input; and output that may provide access to output values from the data operator; wherein the data operator may be functionally coupled to the output port such that values from the output port are fed as input values into the data operator; and/or an incrementor that may be functionally coupled to the data loop that shifts the index relative to the simple-feedback looped array.

It may be that the data loop further includes an input port. It may be that values from the output port are multibit values. It may be that the data loop is a universal shift register. It may be that the data loop is a shift register. It may be that the data operator is a decoupling operation that may be selected from the group consisting of: XOR, Mask Generator, Data MUX, and MOD.

There may also be a second data loop that may have an input port that may be functionally coupled to the output of the data operator such that output values from the data operator are input into the second data loop.

There may also be a source of random data that may be functionally coupled to the input port of the data loop, such that the looped array of random data is fed data from the source of random data.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
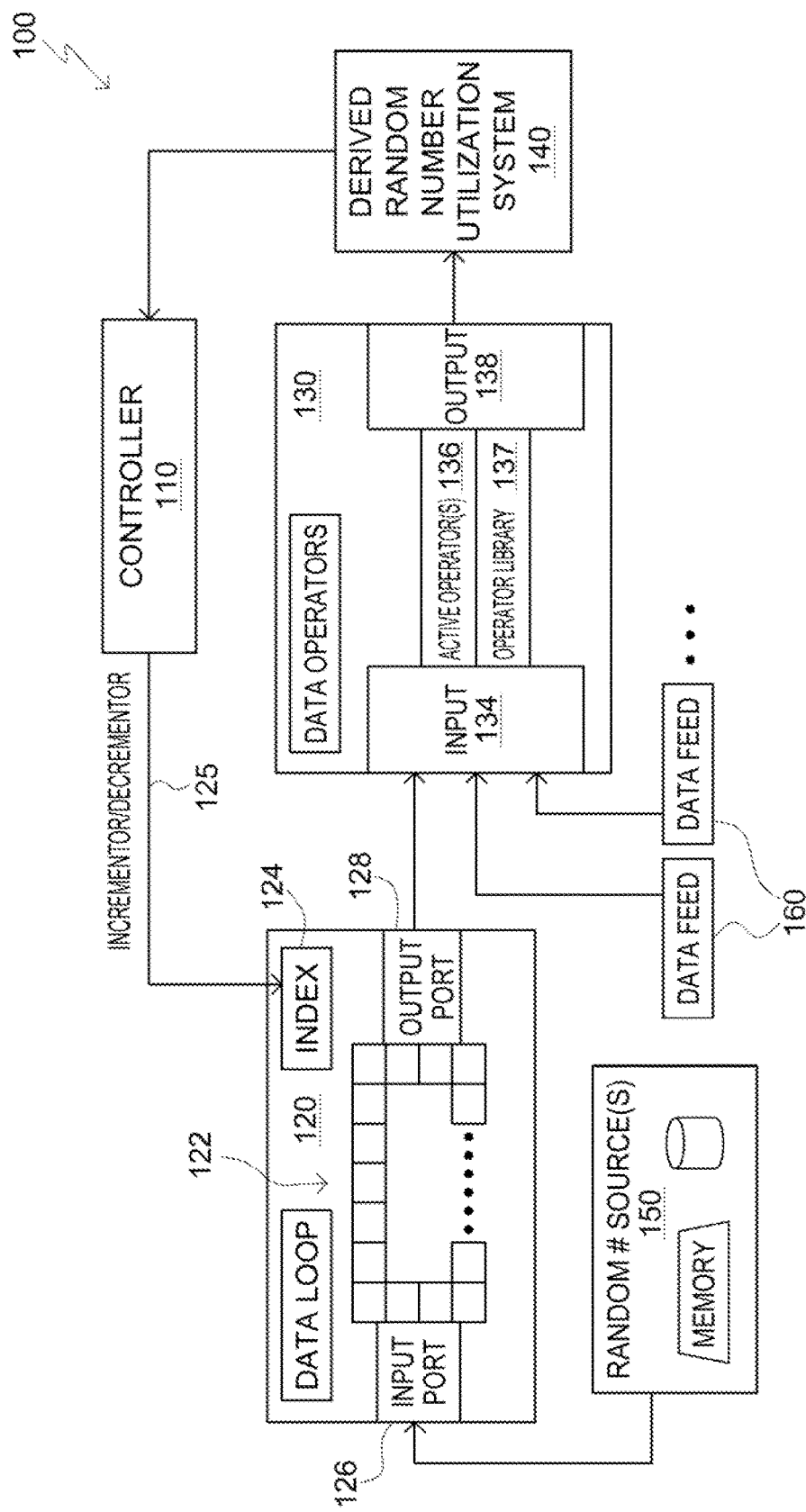
FIG. 1 illustrates a computerized system for efficiently generating a stream of random numbers, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a computerized system 100 for efficiently generating a stream of random number, according to one embodiment of the invention. There is shown a controller 110 operationally coupled to a data loop 120, a data operator(s) 130, and a derived random number utilization system (DRNUS) 140. There is also a random number source 150 functionally coupled to the data loop 120 and a plurality of data feeds 160 coupled to the data operator(s) 130. The illustrated data loop 120 also feeds into the data operator(s) 130, which in turn feeds into the derived random number utilization system 140. The DRNUS 140 may or may not be a part of the illustrated system depending on the particular implementation.

The illustrated controller 110 provides operational control over the various portions of the illustrated system. The controller may include one or more scripts, programs, control circuits, processors, busses, memory, network adaptors, power systems, and the like such that the controller may interface with the data loop, data operator(s) and the derived random number utilization system and provide instructions and/or control signals thereto, along with any analysis, processing, or configuration thereof. The controller may be a microcontroller, a plug-in board, a state machine, a flash controller, and/or the like and/or combinations thereof. The controller is coupled to the data loop at least via an incrementor 125, which may be embodied within the controller, within the data loop, and/or therebetween. The controller sends increment/decrement signal(s) to the data loop which, via the incrementor/decrementor 125 (incrementor and decrementor, as used herein are synonymous) cause the index of the data loop to move location relative to the looped array of the data loop. The incrementor 125 may be as simple as a clock signal that is coupled to the shift register in a manner that causes the shift register to shift values about the loop, thereby moving values thereof relative to other structure (e.g. index, input/output port(s)). The incrementor 125 may include logical circuits that change which lines are actively coupled to the loop so that structures are coupled to the loop in different locations. Such may include gated connections that are either open or closed according to the gate signal(s). The exact implementation of the incrementor will generally follow operational requirements and manufacturing constraints, as there are many implementations that may be very expensive, slow, difficult, and/or require heavy power requirements as compared to others and therefor it is generally expected that simple incrementor structures will be generally preferred.

Accordingly, the controller may manage the relative location of the index and changes thereto. The controller sends control signals to the data operator(s) to manage selection, change, alteration, activate, deactivate, drive, etc. the active operator(s) from the operator library of the data operators. The controller receives requests from the derived random number utilization system for additional derived random numbers and in response to such requests drives activity of the data loop and the data operator(s) to produce derived random numbers to meet the requested demand.

The following is a non-limiting prophetic example of a controller and its internal structure. Such a controller may include a bus through which it is in communication with a system that requires derived random numbers. The controller receives such requests and utilizes an internal driver to interpret such requests, e.g. how many numbers are desired, when, what address/instance is specified for the resulting values, what format/size/range are satisfactory to meet the request. The controller may then check an index age counter within the controller that counts the number of times that checks whether or not the index needs to be moved before generating additional random numbers. If the age counter is at zero, then a control signal is sent to the incrementor to increment the index, thereby moving it's location relative to the looped array and then the age counter is reset to a number (which may be predefined according to a schema or may be a random number that may be derived from the random number source and/or from output of the computerized system itself). If it is not zero then the age counter is decremented. The controller may also check an operator age counter and if that counter is non-zero, then it may be decremented, but if it is zero, then it is reset and a signal is sent to the data operator(s) to select a new operator from the operator library, which may be selected according to a predefined or random schema.

The controller may then signal the data loop and the data operator(s) to, together, generate a specific number of random values and output those to the derived random number utilization system at a particular network address or otherwise make those available to the DRNUS. Where additional random values are required by the illustrated system in operation thereof, random values in addition to those requested by the DRNUS may be ordered by the controller and specific delivery addresses/locations may be used. Alternatively, the computerized system may "double-dip" by utilizing random values generated in service of one or more DRNUS internally as well as delivering or otherwise making those values available to the requesting DRNUS. As a non-limiting example, the illustrated data feeds 160 may be network address locations and/or memory locations where output of the data operator(s) sends derived random values to then be used by the data operator(s) in crafting subsequent random values. Further, as the illustrated system utilizes a random number source 150, that random number source may be the output of the illustrated data operator(s) and/or the output of a separate computerized system for efficiently generating random numbers, as described herein.

The illustrated data loop 120 includes a simple-feedback looped array of random data 122 having an index 124 associated therewith at a particular location within the looped array. There is also an input port 126 and an output port 128 via which data may be imported into the looped array and may be exported therefrom, each in relation to the index location. Such may be a shift register that may be manufactured using D-type flip-flops, generally one flip-flop for each data bit. The data loop may be a shift register. Such a shift register may be a universal shift register such as but not limited to TTL 74LS194, 74LS195 or the CMOS 4035. Further, many integrated circuits include shift registers as components of the chip (e.g. CPU, GPU, Serial Ports, System on a Chip "SoC").

The illustrated simple-feedback looped array of random data 122 is a hardware memory element that structures the array into a loop (i.e. the head and the tail of the array are adjacent to each other). Further, where the hardware includes the ability to shift data along location(s) of the loop, there is a simple-feedback relationship between the head and tail of the loop, such that data that would pass from the tail to the head, or vice-versa, does so without a change in the data values thereof. This is different from a linear or non-linear feedback shift register in that data values passing between head and tail of the loop of such registers will change according to a linear or non-linear process. As non-limiting examples, a simple-feedback looped array of random data may be implemented as a circular shift register, a circular memory buffer, a series of sequential (either actually sequential or logically sequential) memory address locations on a hard drive, solid-state drive, flash drive, RAM, SRAM, DRAM, Z-RAM, A-RAM, FERAM, CBRAM, PRAM, STT-RAM, SONOS, RRAM, racetrack memory, NRAM, 3D XPOINT, millipede memory, Virtual memory tied to one or more various hardware memory sources, ROM, PROM, EPROM, EEPROM, and the like and combinations thereof.

The size of the data loop (i.e. the number of serial bits) will generally be of a sufficient size that it may produce desired output in a manner satisfactory to its intended use. This generally means that the data loop will be large compared to the expected use velocity (e.g. the larger the data loop is, the lower the frequency that it will need to be reloaded with more data from the random number source). Accordingly, the size of the data loop is selected to be large enough that the reload operation does not significantly impair desired operational speed/efficiency.

The illustrated index 124 points to a particular location within the looped array of random data. It may point to the boundary between the head and tail of the looped array or may point to a different location. The index itself may be movable while the looped array remains fixed, the index may remain static while the looped array may shift data along the array, or both may move relative to each other. Regardless of the actual motion/shifting of the index and looped array, it is possible to change their locational relationship to each other and thereby change an effective "value" held by the looped array. It may be that changing the locational relationship between he index and the looped array may also change a locational relationship between the input/output port(s) and the looped array and/or the index. Hardware representation of the index will vary according to the specific hardware environment of the looped array. The index may be as simple as a record metatag, a gate, a line-in, a uniquely identified memory cell, or the like or combinations thereof, or it may be a more complicated implementation, such as but not limited to a separate record, a pointer implementation in a computerized program/script, a counter, or the like or combinations thereof.

As a non-limiting prophetic example, the following may be a string of binary values held within a 16-bit looped array, as defined by the relationship of the index to the looped array. While a 16-bit example is provided in order to help explain the concept of the simple-feedback looped array, it is contemplated that many practical implementations of the simple-feedback looped array described herein will be looped arrays of thousands to millions of bits or more:

1001011110010010

This value is represented in decimal as 38802. When this value is shifted by one bit to the right in a simple-feedback looped array, the value changes to:

0100101111001001

This new value is represented in decimal as 19401. Subsequent one-bit shifted values represented in decimal are: 42468, 21234, 10617, 38076, and 19038. The 16-bit looped array may be shifted 15 times before repeating the sequence. Accordingly, a single 16-bit value loaded into the simple-feedback looped array may be utilized as though it were actually 16 different values.

The illustrated input port 126 and the illustrated output port 128 allows write/read operations into/from the looped array so that values stored therein may be changed to new values and so that values stored therein may be read therefrom. The ports may be a single bit write/read port that allows for a single bit to be changed/read. In such a case, the entire looped array may be rewritten/read by changing/reading one bit, then shifting the looped array to shift a new value to the port and then writing/reading that bit and then repeating until the entire looped array has been rewritten/read. The input port may be a multiple bit write port that allows for writing to multiple bits at a time, which may even include write capabilities to every bit of the looped array. The structure of the input port will vary according to the hardware of the lopped array. Where the looped array is a shift register, the input port may simply include a line-in with a gate to determine whether the input port writes or not. Shift register ports (and other ports) may be serial-in serial-out (SISO) ports, serial-in parallel-out (SIPO) ports, or parallel-in serial-out (PISO)).

The illustrated random number source 150 provides true-random and/or pseudo-random values to the data loop. Such values may be derived from physical sources, such as sampling atmospheric noise, thermal noise, radio noise, clock drift, avalanche noise in Zener diodes, optical chaos, amplified spontaneous emission noise, external electromagnetic and/or quantum phenomena (e.g. radioactive decay, cosmic background radiation), pseudo-random number generators (PRNG) such as but not limited to: linear congruential generators, middle-square methods, the Weyl sequence, the Lehmer generator, the Lagged Fibonacci generator, Linear-feedback shift registers, the Wichmann-Hill generator, Rule 30, Inversive congruential generator, Park-Miller generator, ACORN generator, MIXMAX generator, Add-with-carry, Subtract-with-borrow, Multiply-with-carry, Maximally periodic reciprocals, KISS, Xorshift, WELL, JSF, ARS, Threefry, Philox, SplitMix, PCG, Xoroshiro 128+, 64-bit MELG, Squares RNG, and those based on the Mersenne Twister algorithm. There is also the TRNG9803 hardware random number generator which combines multiple methods together. Further, there are cryptographic algorithms for (expensively) producing very high-quality streams of random values, including but not limited to stream ciphers, block ciphers, and cryptographic hash functions. There are also approaches that link computationally difficult problems instead of relying on algorithms, which can produce high quality values, but at great computational expanse, including but not limited to the Blum-Micali algorithm, the Blum Blum Shub, and the Naor-Reingold pseudorandom function.

The illustrated random number source 150 may include a memory storage device for holding random values to be fed into the system. It may also include hardware and/or software for implementing one or more algorithms and/or computational operations for producing random values as needed by the illustrated system. As a non-limiting example, the illustrated system may be utilized to produce random values for itself and/or for another computerized system as described herein. Accordingly, the system described herein could be daisy-chained to various implementations of itself to produce multiple streams of random values.

The illustrated data operators 130 manipulate the output of the data loop 120 and is functionally coupled to the output port 128 thereof. The data operators 130 values from the output port 128 and from a plurality of data feeds 160 into an input 134. The input is functionally coupled to an active operator 136 that is activated from the illustrated operator library 137. The active operator 136 operates on the received values and is functionally coupled to an output 138 to which it provides resultant values.

The data operators which may be utilized are plethoric and may include one or more arithmetic and/or bitwise operations. Non-limiting examples include adding one, dividing by two (with round down or round up), bitwise NOT, and the like. These examples are examples of data operators that change the input value from the input value to some other value and such is sufficient to produce a new value. That new value may or may not preserve randomness qualities of the original values, which may or may not be important depending on the particular implementation needed.

However, in many cases it will be important and/or valuable for the data operators to have particular qualities. One such quality is that the data operator decouples the resulting output from the input, meaning that the input value is not determinable by knowing the operator and the output. As examples, if the operator is Add one or Divide by two, and the operator (including one of the operands) is known, and the resulting value is known, the input is also known. e.g. if your operator is $x+1=y$ and you know y, then you also know x. In contrast, if the operator is an Add or Divide but the other operand comes from a data feed which is unknown, then the input cannot be determined by knowing the output and the operator (e.g. where $x+z=y$ and you know y, that does not determine the value for the input x). This decoupling provides significant value for many implementations. The following are non-limiting examples of decoupling operators, wherein the input operands are not specified together with the operator: two or more operands arithmetic Add, Subtract, Divide, Mod; bitwise OR, XOR, ADD; Mask/MUX operations; and the like and combinations thereof.

Another data operator quality is the preservation of randomness quality from the input to the output. Different operators can preserve/maintain or degrade the qualities of randomness of the input. It is generally not possible to reliably improve the randomness qualities of the input to the output with data operators. As a non-limiting example, an operator that has a significant bias over time towards producing one of 1s or 0s even where the input does not have a bias towards that value (e.g. arithmetic Add one) in the output will degrade the randomness quality. This is because one of the tests for randomness is to check for substantially equal numbers of 1s and 0s in the output. For many purposes, degrading the randomness quality is not suitable.

XOR, Mod, and Mask/MUX are examples of data operators that preserve the randomness of the input streams. In particular, such operators do not have a bias towards any particular value and do not have a tendency towards producing patterns within the output streams, as they are not recursive functions and thus do not have any "memory" between sequential operations.

Still yet another data operator quality is whether the data operator consumes more "randomness" than it produces. XOR and Mask/MUX each require multiple random value streams to operate and then produce a single stream of random values. Accordingly, it can be said that they consume more values than they produce. In contrast, a Mod operator can continue to produce random values with a single static divisor and therefore only consumes a single random value stream to produce a single random value stream. It is also possible for the Mod to produce more bits of random values than it consumes. Accordingly, Mod operators and the like have the quality of maintaining or multiplying the amount of random values within a system and this can be beneficial for some applications.

The illustrated data feeds 160 provide values to the data operators 130 for use thereby in the manipulation of values from the data loop 120. There are shown a plurality of data feeds 160 and the exact number of different data feeds will depend from implementation to implantation. In particular, various operators within the operator library may require multiple inputs of values in order to execute their respecting value manipulations and the data feeds allow for a supply of such values. Such may include outputs of PRNG functions, pools of uncertain values, real-time feeds of random values (e.g. atmospheric noise), outputs of systems similar to that described herein, and the like and combinations thereof. The exact makeup of the data feeds will depend on the purposes to be served by the specific implementation and on operational constraints. As a non-limiting example, wherein replication or paired generation of output values from data operators are desired, the data feeds will generally be required to be sourced in an exactly repeatable/replicable manner (e.g. PRNG) and not in a manner that is not exactly replicable (e.g. atmospheric noise).

The illustrated derived random number utilization system (DRNUS) 140 is functionally coupled to the data operators 130 such that the DRNUS may receive values therefrom. The DRNUS 140 is also functionally coupled to the controller 110 such that it may request values therefrom and/or provide request characteristics to the controller 110 (e.g. value bit-length, value quality, seed values and/or other metadata necessary to replicate a set of random values such as but not limited to situations where the DRNUS needs to receive a duplicate set of random values as that of a paired system). Non-limiting examples of DRNUS 140 include programs/systems that utilize random values (e.g. gambling engines, gambling devices, simulation systems, gaming systems, cryptography systems, authenticators, key generators, compression engines, expansion circuits, hash circuits, noise generators, statistical sampling systems, and the like and combinations thereof. As such, a computerized system for efficiently generating a stream of random numbers, similar to embodiments described herein could also be a DRNUS of another such system.

In operation, a data loop 120 is loaded with values from a random source 150 via its input port 126. A derived random number utilization system DRNUS 140 requests values from a controller 110, which request may include details regarding the requested values. The controller 110 may provide operational instructions to a set of data operators 130 and/or an incrementor 125 coupled to an index 124 of the data loop. Such instructions may include one or more of the following sets of instructions (or similar instructions), which may be carried out directly by the recipient and/or indirectly by issuing further instructions to an appropriate resource:

Increment/decrement the index 124 in relation to the loop 122

Start/end/change output of values from the data loop 120 through the output port 128 to the input of the data operators 130

Start/end/change output of values from one or more data feeds 160

Start/end/change an active operator 136

Alter a limitation placed on the operator library 137 (e.g. which operators or groups of operators are valid selections)

Toggle output of values from the output 138 and/or the output port 128

Change a mode of output from the output 138 and/or the output port 128 (e.g. word size, value type e.g. binary, trinary, decimal)

Load values from the random number source 150 into the data loop 120

End/begin/alter a connection between resources of the system (e.g. couple a new data feed to the input of the data operators, swap out a data loop that is coupled to the input of the data operators, add in a parallel operating data operators to the system to be fed by the same data loop, switch to a new DRNUS and terminate an existing DRNUS connection The system, under the instructions of the controller 110 feeds values from the data loop 120 to the data operators 130, where those values are manipulated and then output to the DRNUS according to the request. Generally, the manipulation provided by the data operators will decouple the output of the data operators from the output of the data loop, but this is not always the case.

As a non-limiting example, where the active operator performs a simple NOT operation, the output retains the quality characteristics of the random values of the data loop but is not decoupled therefrom. In particular, the NOT operation flips the bit values from 1 to 0 and from 0 to 1. This preserves (as an inverse) the ratio of 1 and 0 value within the stream because it essentially creates a mirror image thereof and in evaluating a random value stream, the inverse ratio is the same quality as the non-inverse ratio, since quality is judged as compared to a "distance" from a unitary ratio. However, the mirror image of the values from the data loop provides a map of what those values are. Specifically, knowing the output of the data operators and that a NOT operator was used, one can tell what the data loop values are. That said, where decoupling is not necessary, a NOT operator provides very fast and efficient output values that are different from those loaded into the data loop.

For purposes requiring decoupling, the following non-limiting operator types are useful: XOR, Mask Generator, Data MUX, and MOD. These operator types require use of the data feed(s) and are able to produce output values that are decoupled from the values stored in the data loop. In particular, if the operator is known and the output is known, the values within the data loop are not revealed. Further, the values from the data feed are not revealed. Accordingly, the security of the values in the data loop are preserved even if the architecture of the system is known. This is tremendously valuable as it allows for the values stored in the data loop to operate as though that are a one-time pad, which is commonly understood to be provably unbreakable, while PRNGs, not matter how complicated, are provably breakable.

According to one embodiment, there may be a computerized system for efficiently generating a stream of random numbers. The system may include one or more of: a data loop, including one or more of: a simple-feedback looped array of random data; an index; and/or an output port that reads values from the simple-feedback looped array that may be based on a relative location of the index with respect to the simple-feedback looped array; a data operator, having one or more of: an input; and output that may provide access to output values from the data operator; wherein the data operator may be functionally coupled to the output port such that values from the output port are fed as input values into the data operator; and/or an incrementor that may be functionally coupled to the data loop that shifts the index relative to the simple-feedback looped array.

It may be that the data loop further includes an input port. It may be that values from the output port are multibit values. It may be that the data loop is a universal shift register. It may be that the data loop is a shift register. It may be that the data operator is a decoupling operation that may be selected from the group consisting of: XOR, Mask Generator, Data MUX, and MOD.

There may also be a second data loop that may have an input port that may be functionally coupled to the output of the data operator such that output values from the data operator are input into the second data loop. There may also be a source of random data that may be functionally coupled to the input port of the data loop, such that the looped array of random data is fed data from the source of random data.

Figure 2:
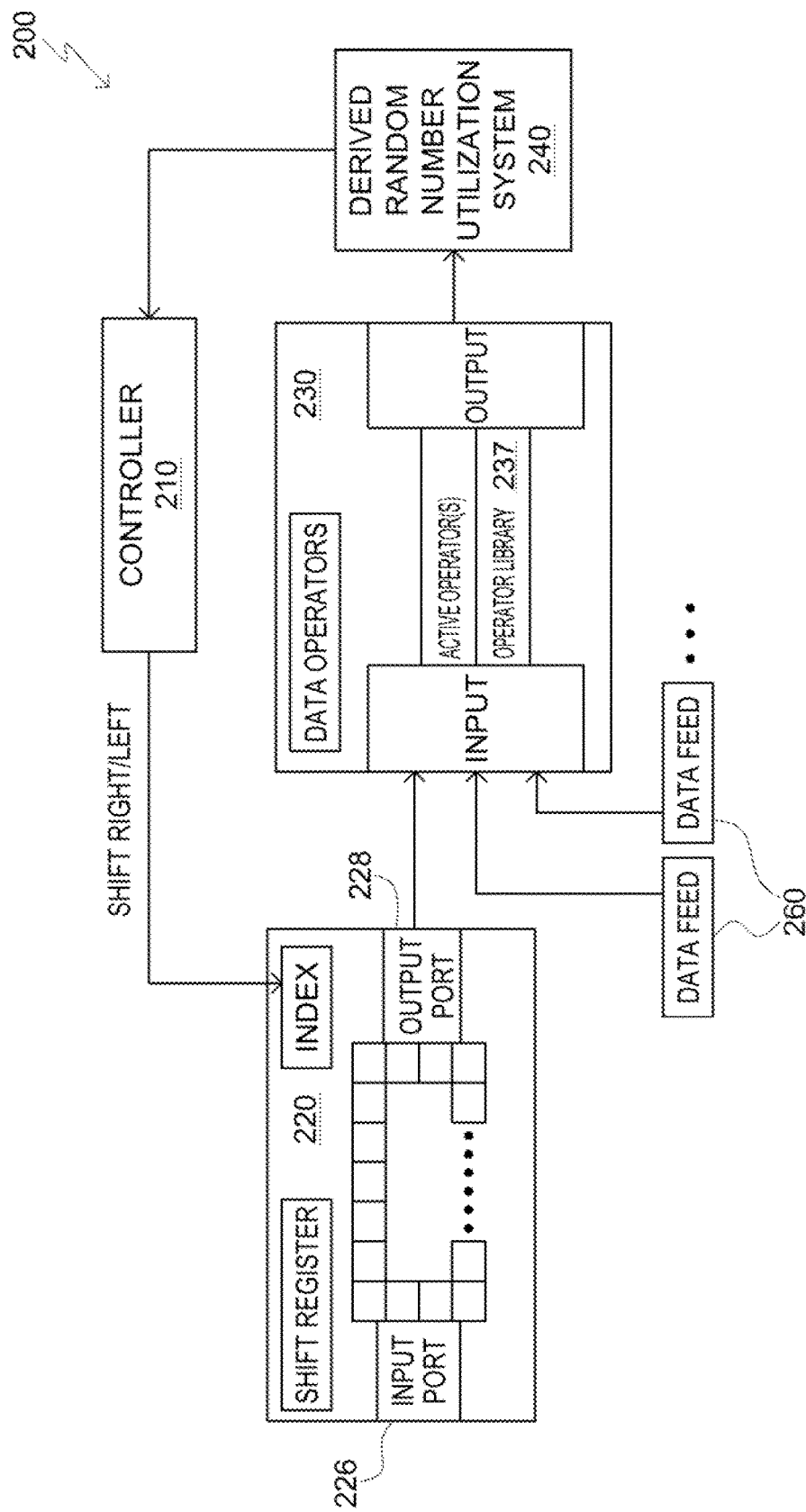
FIG. 2 illustrates a primarily hardware computerized system for efficiently generating a stream of random numbers, according to one embodiment of the invention.

FIG. 2 illustrates a primarily hardware computerized system 200 for efficiently generating a stream of random number, according to one embodiment of the invention. There is shown a controller 210 operationally coupled to a shift register 220, a data operator(s) 230, and a derived random number utilization system (DRNUS) 240. There are also shown a plurality of data feeds 260 coupled to the data operator(s) 230. The illustrated shift register 220 also feeds into the data operator(s) 230, which in turn feeds into the derived random number utilization system 240. The DRNUS 240 may or may not be a part of the illustrated system depending on the particular implementation.

In contrast to FIG. 1, there is no random number source functionally coupled to the shift register 220. The illustrated shift register is loaded on manufacture thereof and does not change. Accordingly, the shift register will be of a sufficient size that it may produce desired output in a manner satisfactory to its intended use. This generally means that the shift register will be very large compared to the expected use cycle. As a non-limiting example, where the device is expected to produce approximately 500,000 random values of output during the lifetime of the device, a shift register of 10,000+ bits would be far more than sufficient to the expected use and therefore would not need to be fed any further random values.

The illustrated shift register 220 is generally a cascade of flip flops sharing the same clock. The output of each flip flop is connected to the input of the next flip flop in the chain/loop. Accordingly, the circuit shifts the bit array stored therein by one position at each transition of the clock input (i.e. shift right/left). This occurs where, on the clock signal, each flip flop shifts its value to the input of the next flip flop. Wherein the shift register is a simple feedback shift register (aka circular shift register) than the last bit in the array shifts to the input of the first bit in the array without change or manipulation.

Shift registers can have both parallel and serial inputs and outputs (e.g. SIPO and/or PISO configurations). The illustrated output port 228 may include a plurality of pins/lines to allow for simultaneous output of multiple bits with each shift of the register, up to the total number of bits in the shift register. It may also be that the input port 226 of the illustrated shift register may be disabled or removed after manufacture, to prevent any further changes to the values in the array. While typical shift registers used in various computing applications (e.g. delay circuits, hardware stack implementations, hardware solutions to problems with too few pins/lines, changing output/input to/from parallel and serial, as pulse extenders, and circulating memory) are in the order magnitude of 10, 100, 1000, or 10k bit arrays, it is contemplated that shift registers used in various embodiments of the present invention may be much larger, on the order of 100k, 1M, 10M, 100M, and/or 1B+.

Wherein the illustrated controller and data operators are also hardware devices, FIG. 2 may represent an entirely hardware system for efficiently generating a stream of random numbers. In such an example, the operator library 237 may include an array of operator circuits (e.g. XOR, MUX, MOD, Mask Generator) that are gated such that only one (or an otherwise limited amount) may be active at a time, with each having similarly gated/limited access to the output. The data feed 260 may include hardware random number generators including but not limited to hardware PRNG generators and/or memory components (e.g. delay circuits, circulating memory) having random values stored therein.

Figure 3:
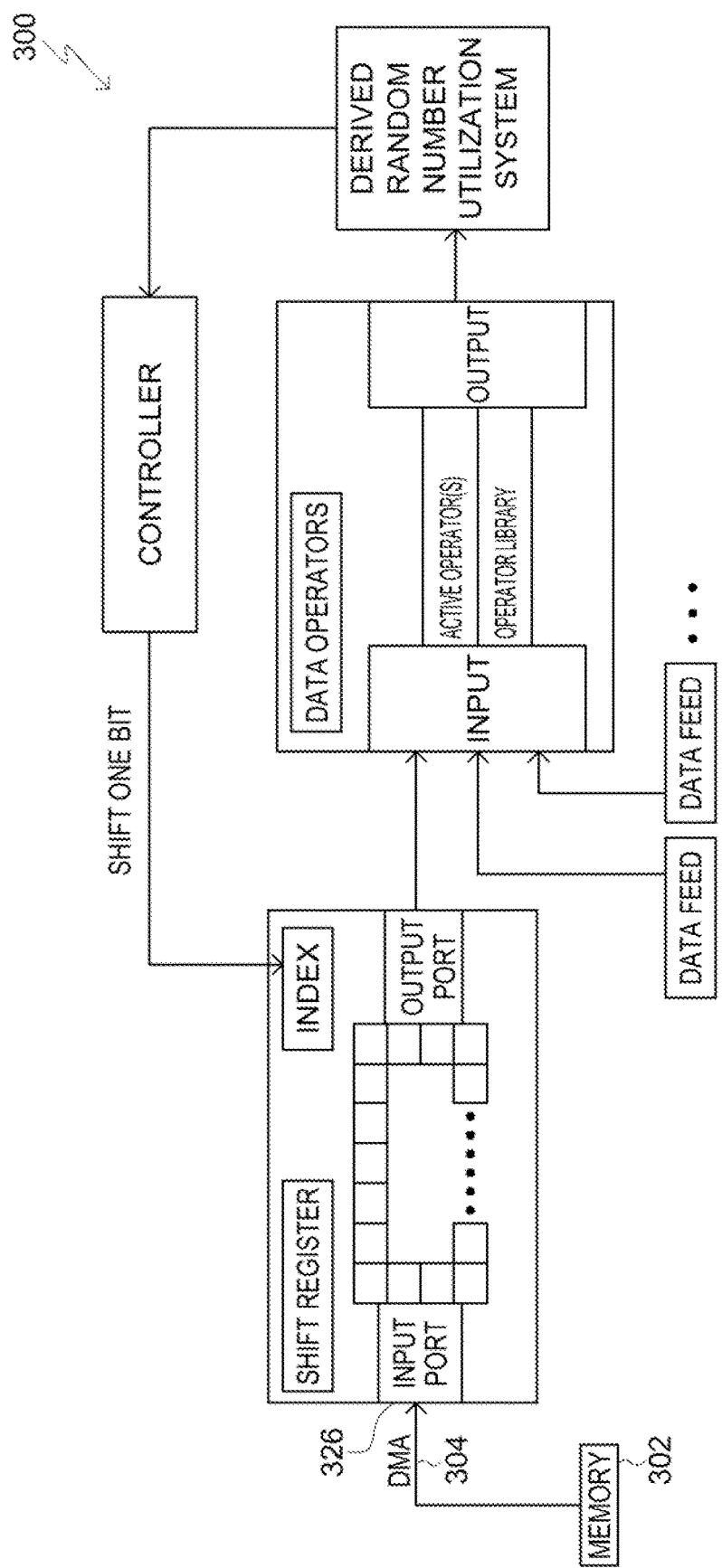
FIG. 3 illustrates a hybrid hardware computerized system for efficiently generating a stream of random numbers, according to one embodiment of the invention.

FIG. 3 illustrates a hybrid hardware computerized system 300 for efficiently generating a stream of random numbers, according to one embodiment of the invention. The illustrated system includes a controller operationally coupled to a shift register, a data operators, and a derived random number utilization system (DRNUS). There is also a memory component 302 functionally coupled to the input port 326 of the shift register via a direct memory access (DMA) 304. There are a plurality of data feeds coupled to the data operators. The illustrated shift register also feeds into the data operators, which in turn feeds into the derived random number utilization system. The DRNUS may or may not be a part of the illustrated system depending on the particular implementation.

The illustrated memory component is a device that is used to store information for use in a computer or related hardware device. This will typically be semiconductor memory devices, often metal-oxide semiconductor (MOS) memory where data is stored within memory cells on a silicon integrated circuit chip. Such may be implemented as RAM, DRAM, SRAM, cache memory, ROM, PROM, EPROM, EEPROM, tape drive memory storage, hard drive memory storage, floppy disk memory storage, CD/DVD/optical disc storage, volatile/nonvolatile/semivolatile memory, FERAM, CBRAM, PRAM, STT-RAM, SONOS, RRAM, racetrack memory, NRAM, 3D XPoint, virtual memory, and/or millipede memory and/or combinations thereof. The illustrated memory 302 includes random values and is functionally coupled to the shift register via DMA 304.

The illustrated DMA 304 allows memory access independent of a CPU. Accordingly, the illustrated system may operate to load the illustrated shift register with new values on demand without having to wait for or take up CPU cycles. This is of particular importance wherein the DRNUS is utilizing the available CPU cycles and intrusion by the illustrated system on the resources of the CPU would cause a slowdown or lag within the DRNUS. With DMA, the CPU typically first initiates the transfer, then it does other operations while the transfer is in progress, and it finally receives an interrupt from the DMA controller (DMAC) when the operation is done. Standard DMA, also called third-party DMA, uses a DMA controller. A DMA controller can generate memory addresses and initiate memory read or write cycles. It contains several hardware registers that can be written and read by the CPU. These include a memory address register, a byte count register, and one or more control registers.

Depending on what features the DMA controller provides, these control registers might specify some combination of the source, the destination, the direction of the transfer (reading from the I/O device or writing to the I/O device), the size of the transfer unit, and/or the number of words/bytes to transfer in one burst. To carry out an input, output or memory-to-memory operation, the host processor initializes the DMA controller with a count of the number of words to transfer, and the memory address to use. The CPU then commands the peripheral device to initiate a data transfer. The DMA controller then provides addresses and read/write control lines to the system memory. Each time a byte of data is ready to be transferred between the peripheral device and memory, the DMA controller increments its internal address register until the full block of data is transferred.

Figure 4:
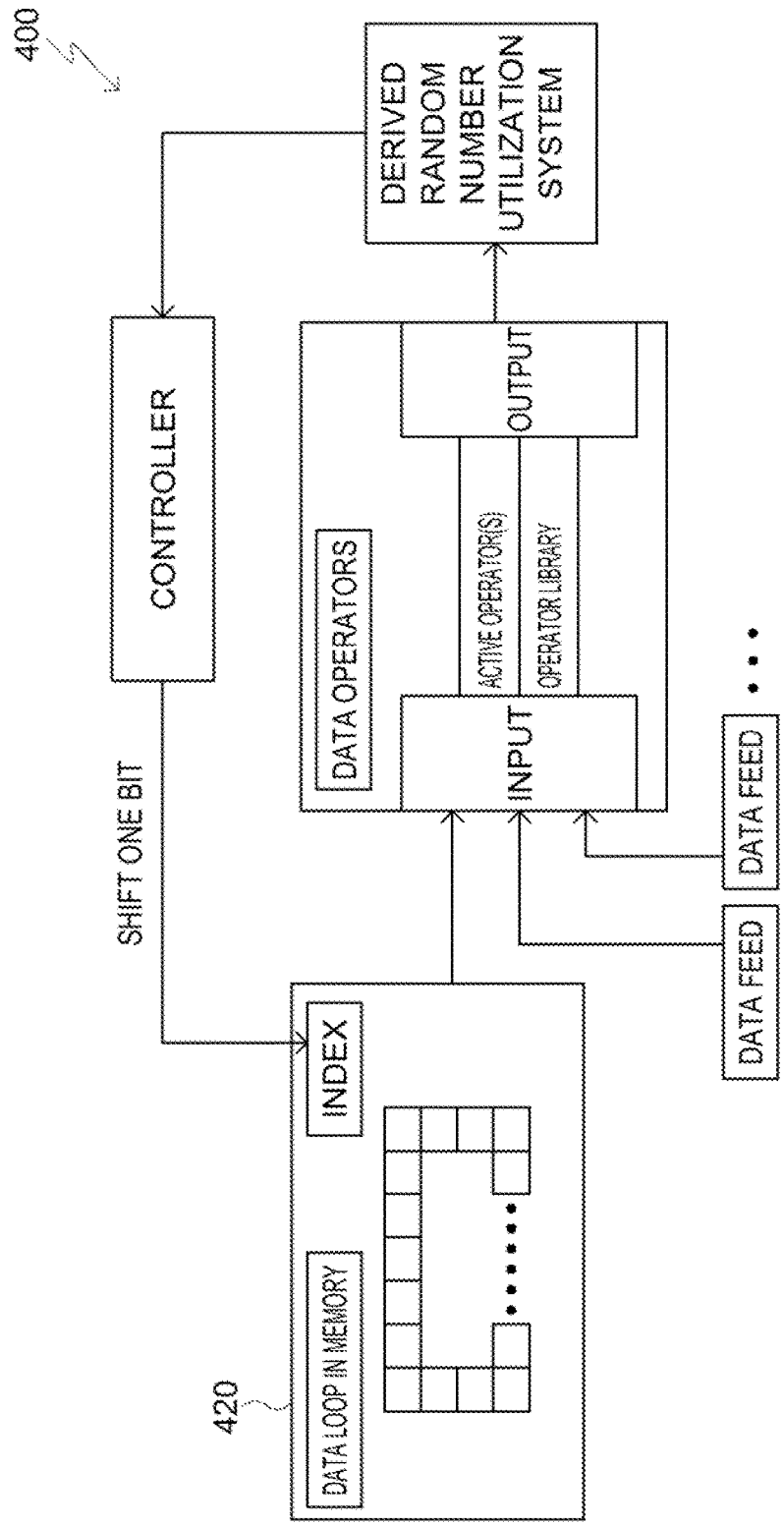
FIG. 4 illustrates a primarily software computerized system for efficiently generating a stream of random numbers, according to one embodiment of the invention.

FIG. 4 illustrates a primarily software computerized system 400 for efficiently generating a stream of random number, according to one embodiment of the invention. There is shown a controller operationally coupled to a data loop in memory 420, a data operators, and a derived random number utilization system (DRNUS). There is also a plurality of data feeds coupled to the data operators. The illustrated data loop in memory 420 also feeds into the data operators, which in turn feeds into the derived random number utilization system. The DRNUS may or may not be a part of the illustrated system depending on the particular implementation.

The illustrated data loop in memory 420 includes one or more memory devices/structures, such as but not limited to those described herein, which may be managed via a memory controller and may include a body of virtual memory and/or even one or more swapfiles, caches, databases and/or even one or more federated databases. The data loop in memory 420 includes a logical arrangement of memory cells, physical and/or virtual (with associated physical components), that are related to each other to form a looped array of memory associated with an index such that the contents of the memory "cells" may be shifted one direction or another and/or such that the index may be shifted relative to the array of memory "cells" while the order of the contents of the memory "cells" remains unchanged. The logical arrangement may be managed/controlled by a script, system of pointers, data array/matrix, and the like and combinations thereof.

Figure 5:
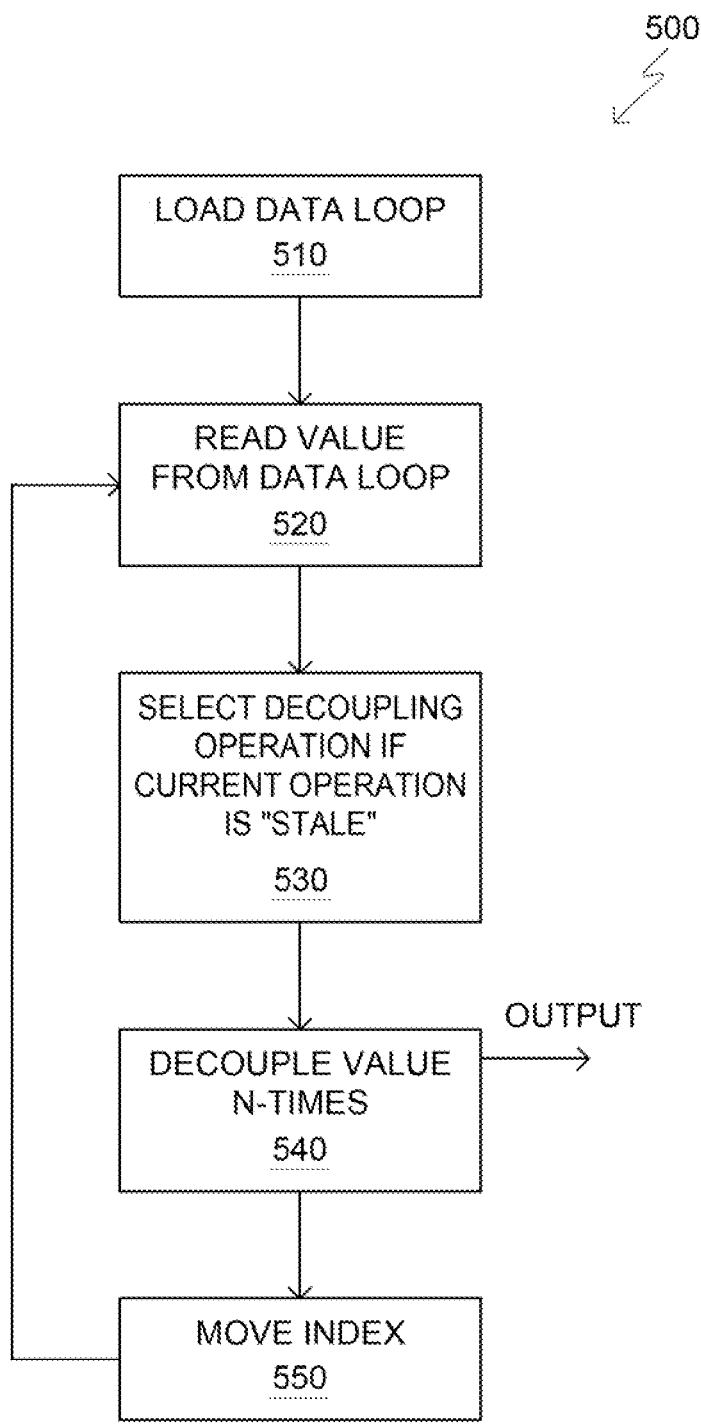
FIG. 5 is a flowchart showing a method of efficiently generating random numbers in a computerized system, according to one embodiment of the invention.

FIG. 5 is a flowchart showing a method of efficiently generating random numbers in a computerized system, according to one embodiment of the invention. The illustrated method of efficiently generating random numbers in a computerized system 500 includes a step of loading 510 a data loop followed by a step of reading 520 a value from the data loop then, where the current decoupling operation is "stale," selecting 530 a decoupling operation, followed by decoupling 540 operation(s) performed on the read value, thereby generating output value(s), after which an index of the data loop is moved 550 and the process loops back to the step of reading 520 a value from the data loop. Advantageously, a single n-digit random value stored within the data loop may be utilized to generate a high number (≥n) of decoupled random values therefrom in an efficient manner.

The illustrated step of loading 510 the data loop sets bit values as stored values within a looped array of data storage units (e.g. memory cells, bit registers, data latches, and flip-flops). The loading may be accomplished serially/sequentially and/or in parallel or combinations thereof. The loading may occur on manufacture of the data loop. It may occur in real-time during operation of the associated device/system for generating random values. There may be one or more input lines that may be gated to allow for write operations to be performed on the data storage units. Wherein the quality of randomness of the results of the decoupling step is generally highly dependent on the quality of randomness of the value within the data loop, it is appropriate to be selective regarding where/how to source the loading value(s) for the step of loading, i.e. that the source of random data from which the data loop is loaded has a quality of randomness greater than or equal to the desired randomness quality intended for the output values.

The illustrated step of reading 520 a value from the data loop includes reading, generally as a sequential (in relation to the relative location of the index to the data storage units) series of bits, multi-bit value(s) from the data storage units of the data loop. The reading may occur as a bit-by-bit read and/or may occur in parallel where multiple bits may be read at the same time (e.g. over a plurality of parallel gated lines in functional communication with specific data storage units). Further, multiple multi-bit values may be read contemporaneously and/or simultaneously from the same data loop, wherein the read structure allows for simultaneous and/or contemporaneous reading from different portions of the same data loop (e.g. two different arrays of gated red lines that are functionally coupled to two non-identical sets of data storage units of the data loop). It may be that the size of the read value is equal to the size of the data loop (e.g. the data loop includes 1 million sequentially arranged data storage units and the read value is 1 million bits in length) or it could be that the size of the read value is smaller than the size of the data loop (e.g. the data loop includes 1 million sequentially arranged data storage units and the read value is fifty-thousand bits in length). As a read value, the value is held/stored by the system/device in a manner that makes it accessible for operation(s) to be performed thereon.

The illustrated step of selecting 530 a decoupling operation includes conditionally determining (e.g. by operation of a script, random selection, instruction by a third party device, set during installation/manufacture of the associated device/system, instructions from a controller) one or more decoupling operations and/or parameters (and the associated physical structure/programming which implements such a decoupling operation and/or parameters thereof) to be utilized therewith to be made "active" such that they can operate on the read value that is held/stored by the system/device. Making the associated structure/programming "active" may include activating one or more gated input lines to a set of transistors, flip-flops, chips, chipsets, etc. that serve to execute the selected decoupling operation, thereby allowing the read value to be input into the structure for processing. Where the decoupling operation includes software components, the activation may include calling a function or software module that executes the selected decoupling operation.

While this step of selecting 530 a decoupling operation may occur within every cycle of the illustrated method, it is generally expected that new decoupling operators and/or parameters are not needed very often. As a non-limiting example, where the loaded value of length n is of a moderate quality of randomness, the device/system that is operating the illustrated method may continue to use the same decoupling operator(s) without changing the same or the parameters used therewith n times before a risk of repeating patterns emerging in the outputs. Accordingly, it is generally expected that this step of selecting 530 will likely not occur for most cycles of the illustrated step, especially where the data loop is large. Indeed, in some implementations (e.g. where the data loop is large and the actual utilization/life-cycle of the system is small compared to the size of the data loop) the step of selecting a decoupling operation may only occur once during manufacture of the device/system and may never be changed thereafter.

The illustrated step of decoupling 540 the read value includes performing the selected decoupling operation(s) on the read value and thereby producing output in the form of a new value that is decoupled from the read value. Such decoupling is performed by the hardware and/or software structure of the selected decoupling operation(s). As a non-limiting example, where the decoupling operation is a XOR operation, it may include a CMOS XOR gate, a MOSFET XOR (e.g. using pass transistor logic), a XNOR gate followed by a NOT gate, and/or the like or combinations thereof.

Where multiple operations are selected, the step of decoupling may be performed multiple times and such may occur in parallel. Accordingly, a single read value may result in a plurality or even multiplicity of output values that are decoupled from the read value. Where a supply of decoupled random values is desired at a rate that is in the order of magnitude of the clock rate of an associated system, this feature of multiple parallel decoupling operations may be utilized to correct for significant mismatches between the clock rates of device/system that is generating the output values and the device/system that desires the output values.

The illustrated step of moving 550 the index of the data loop includes altering a location of the index relative to the looped array of data storage units of the data loop. This may include shifting all of the stored values within the data storage units in one direction by one or more positions. This may include deactivating an active index structure at one location about the data loop and activating an index structure associated with a different position about the data loop. This may include shifting an index value about the data loop (e.g. in the case of a paired set of data loops, a first for the looped array of stored values and a second that circumscribes or is otherwise structurally in parallel with the first and acts to hold the index marker, which could be a single bit-value (e.g. a 1 with all the rest being 0) that shifts about the second loop and thereby identifies the current location of the index about the first loop. As the step of reading 520 is done in relation to the index, moving the index will change what the next read value is to a new value that is significantly different (where the stored value is sufficiently random) compared to the previous read value.

According to one non-limiting embodiment, there is a method of quickly and efficiently generating a series of random numbers from a source of random numbers in a computing system. The method includes one or more of the steps of: loading a data loop with random data that may be from a source of random data, the data loop including one or more of: a looped array of stored values; and an index; reading a value that may be multi-bit from the data loop in relation to a location of the index within the looped array; performing a first data operation on the value thereby deriving a derived random number from the multi-bit value; moving the index in relation to the looped array to a different location within the looped array; and/or repeating one or more of these steps, thereby generating a series of derived random numbers.

It may be that the data loop is a shift register, which may be a simple feedback shift register, wherein "simple feedback" means that data is not manipulated as the shift register increments, but instead remains constant as the values shift through the register and especially for those values that move from "tail" back to the "head" of the register. Such may be manufactured using D-type flip-flops, generally one flip-flop for each data bit. The shift register may be a universal shift register such as but not limited to TTL 74LS194, 74LS195 or the CMOS 4035 and/or may be included as part of a larger integrated circuit (e.g. CPU, GPU, Serial Port, SoC). It may be that the different location is an adjacent location. It may be that the data operation is a decoupling operation which may be selected from the group consisting of: XOR, Mask Generator, Data MUX, and MOD. It may be that the source of random data is the output of one or more methods/steps described herein. It may be that the step of loading the data loop is performed by a direct memory access. It may be that the data operation is a MOD operation performed with the multi-bit value as the numerator and a denominator having fewer bits than the multi-bit value. It may be that the denominator is a value obtained from, directly or derived, from the source of random data. It may be that the denominator is larger than a desired range of the derived random number. It may be that the controller includes one or more of: a programmable logic circuit, a script, and a driver.

There may be a step of automatically selecting the decoupling operation from a plurality of decoupling operations according to a controller. There may be a step of, contemporaneously with the step of performing a first data operation, performing a second data operation on the multi-bit value thereby deriving a second derived random number from the multi-bit value. Further, It may be that a second/secondary computing system independently performs one or more steps described herein using a substantially identical source of random data as a primary computing system such that the data loop of the second computing system loads identically to a data loop of a primary system and substantially identical data operation therewith such that resulting derived random numbers are the same as those derived by a primary system/method, thereby generating a second series of derived random numbers that is identical to the series of derived random numbers of the primary system.

It may be that the second computing system is structurally different from the primary computing system in at least one of type of: data loop, read operator, shifter, controller type, and data loop loader. As a non-limiting example, the second computing system may use a shifter that shifts stored values within the looped array while the first computing system activates and deactivates index structures to thereby shift the index value. As another non-limiting example, the second computing system may utilize a universal shift register as its data loop while the first computing system may utilize a virtual data loop formed using data saved on a hard drive. As still another non-limiting example, the second computing system may utilize DMA while the first does not. As still yet another non-limiting example, the second computing system may have a controller with a script stored in RAM while the first has a pure hardware controller that stores its script in ROM. Each of these examples illustrate first and second computing systems that are capable of generating identical sets of random values while having different specific structural implementations.

Figure 6:
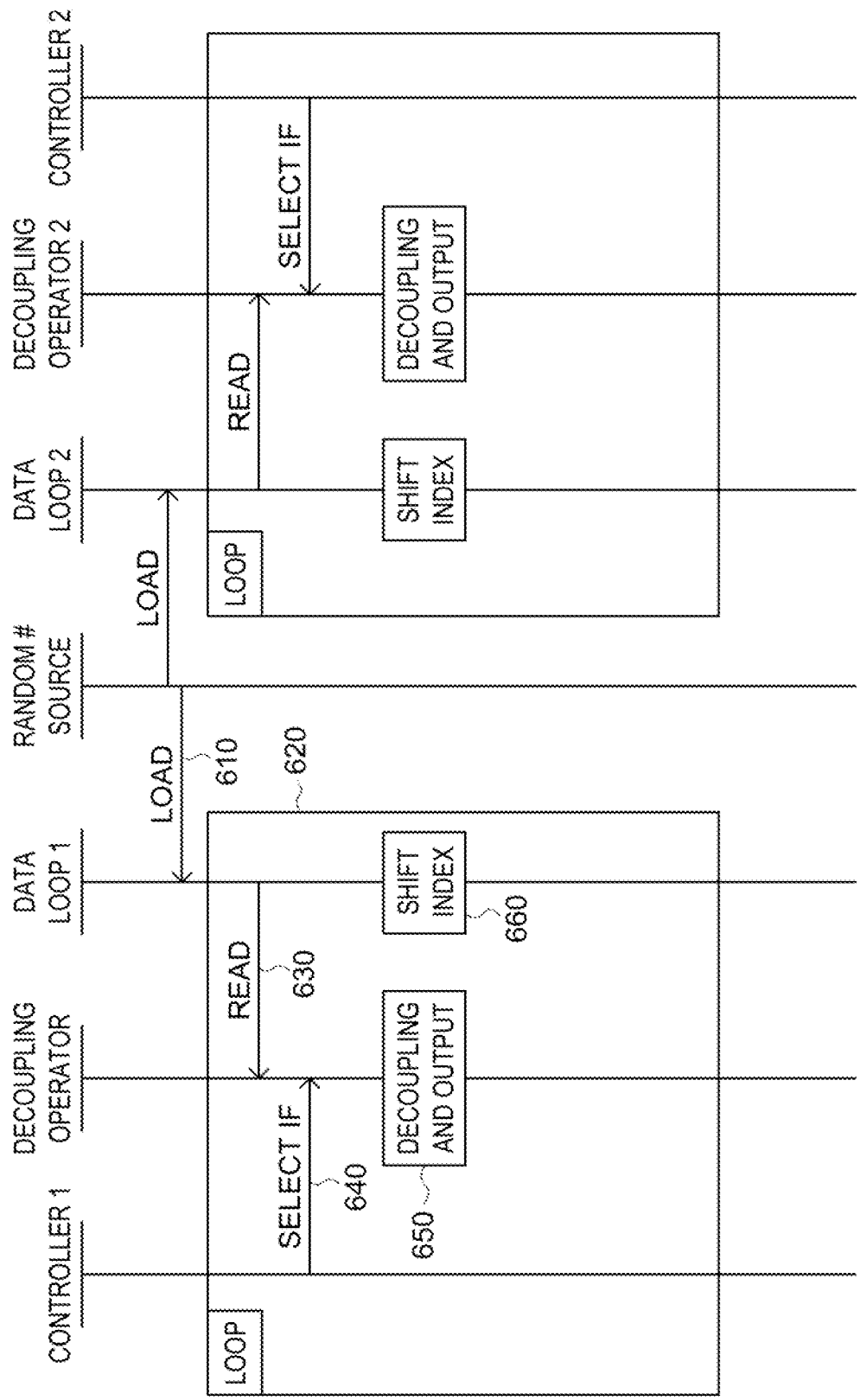
FIG. 6 is a sequence diagram showing a method of efficiently generating random numbers in paired/parallel computerized systems, according to one embodiment of the invention.

FIG. 6 is a sequence diagram showing a method of efficiently generating random numbers in paired/parallel computerized systems, according to one embodiment of the invention. The illustrated computerized systems each include a controller (Controller1 and Controller2) that are functionally coupled to their respective decoupling operators (DecouplingOperator1 and DecouplingOperator2, respectively) which are functionally coupled to their respective data loops (DataLoop1 and DataLoop2, respectively. In the illustrated example, the two computerized systems may be said to be paired systems (i.e. their structure is sufficiently identical so as to produce identical output streams when provided with identical input values from the illustrated Random Number Source). The two computerized systems may, alternatively or additionally, be said to be parallel systems (i.e. their structure includes sufficient differences so as to produce different output streams when provided identical input values from the illustrated Random Number Source. It is also possible, especially in the case of contemporaneous use of multiple decoupling operators within the same system, for the two systems to be both paired and parallel, wherein a stream is produced that is identical between the two systems and also one or more other streams are produced that are not identical between the two systems. Accordingly, a singular random number source may be efficiently utilized across multiple systems as desired to produce outputs in paired/parallel manners.

In the illustrated example, values from a Random Number Source are loaded 610 into the data loop of each system. Then a loop operation 620 is performed within each system wherein the data loop is read 630, a controller determines 640 if a decoupling operator(s) and/or parameter(s) of the same should be changed and if so causes such a change, the decoupling operator(s) then operate 650 on the read value and the result of such operation is provided as output, an index of the data loop is shifted 660 (e.g. incremented) and then the loop repeats, thereby generating a stream of decoupled values.

Figure 7:
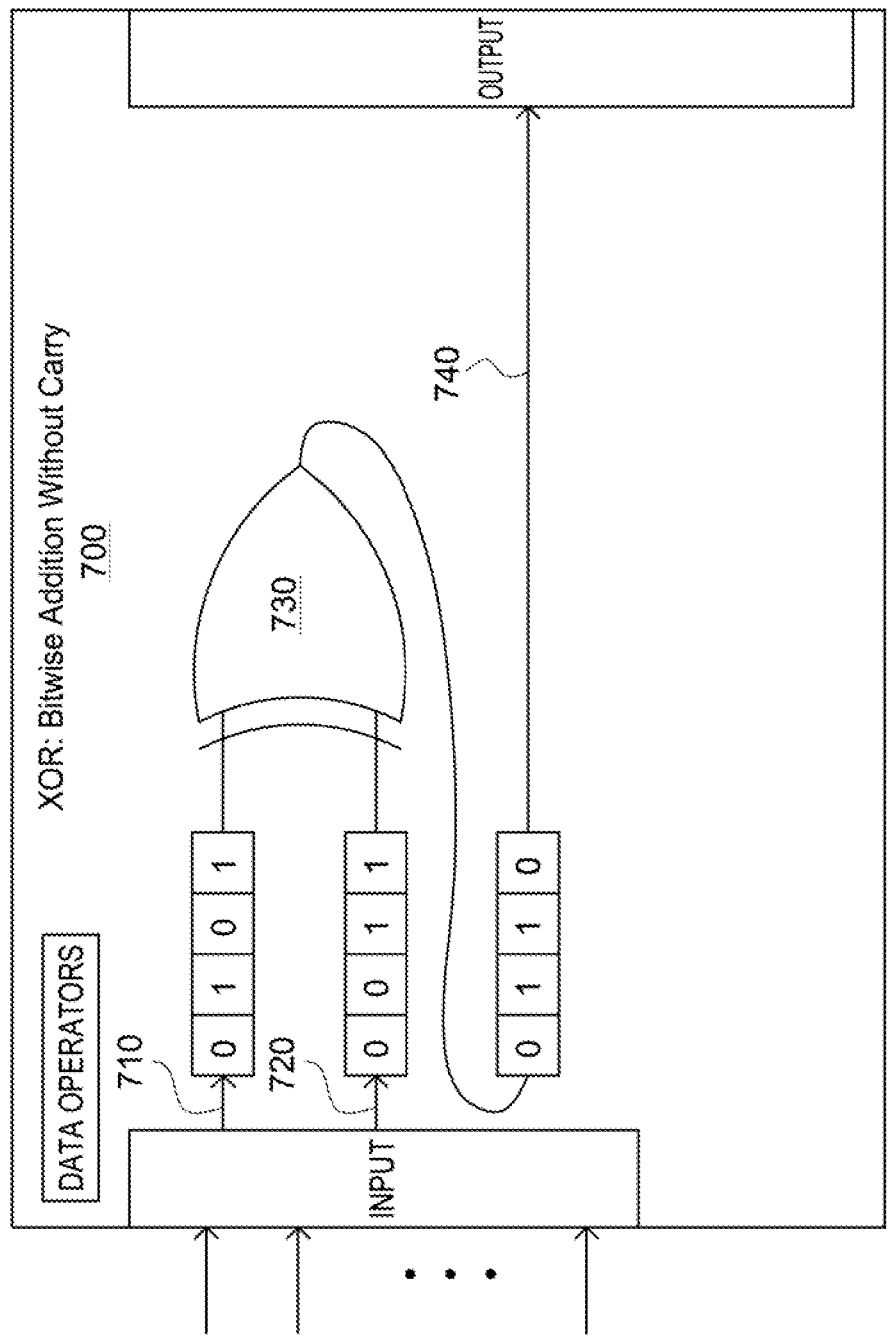
FIG. 7 illustrates implementation of an XOR decoupling operation within a computerized system for efficiently generating random numbers, according to one embodiment of the invention.

FIG. 7 illustrates implementation of an XOR decoupling operation within a computerized system for efficiently generating random numbers, according to one embodiment of the invention. The illustrated XOR decoupling operation 700 is shown as the/an active operator selected from an operator library of a data operators (See FIG. 1) and is therefore functionally coupled to the input of the data operators. The XOR decoupling operation 700 receives the read value 710 as one of its inputs and a second input 720 from a data feed. There is a XOR operator 730, which may be a set of logic gates, a software XOR function, or the like or combinations thereof. Such may include a CMOS XOR gate, a MOSFET XOR (e.g. using pass transistor logic), a XNOR gate followed by a NOT gate, and/or the like or combinations thereof. The XOR operator 730 may include a plurality of sets of logic gates that are able to each perform an XOR operation on a single bit, but together are able to perform an XOR operation on many or all of the bits of the read value 710 simultaneously. The output of the XOR operator 740 is functionally coupled to the output of the data operators so that the same may be provided as desired to one or more DRNUS (See FIG. 1).

Figure 8:
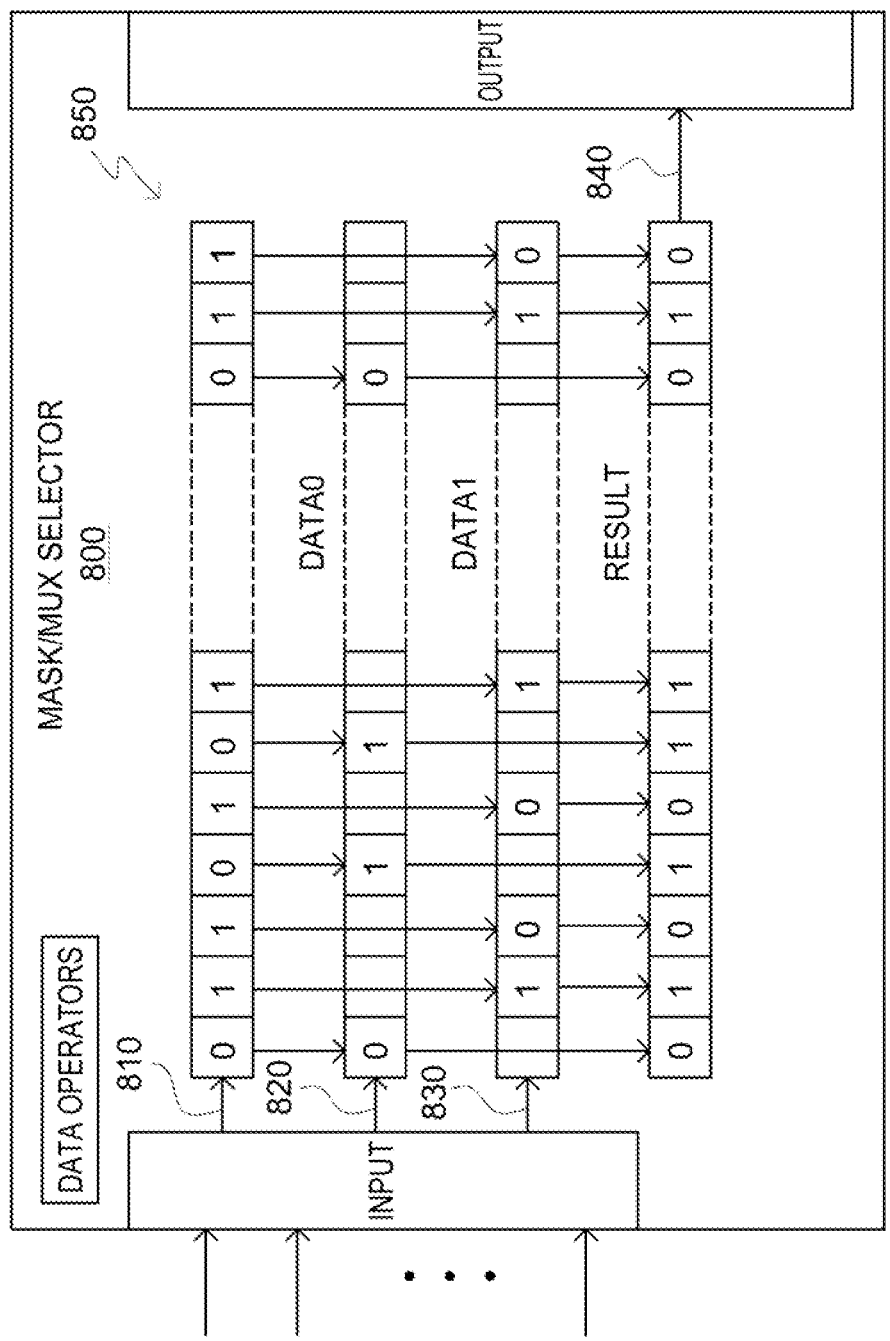
FIG. 8 illustrates implementation of a Mask Generator or Data Mux decoupling operation within a computerized system for efficiently generating random numbers, according to one embodiment of the invention.

FIG. 8 illustrates implementation of a Mask Generator or Data Mux (multiplexer) decoupling operation (Mask/MUX selector/operator) within a computerized system for efficiently generating random numbers, according to one embodiment of the invention. For clarity, a Mask operator/generator is a software implementation of a Data MUX. The illustrated Mask/MUX selector 800 is shown as the/an active operator selected from an operator library of a data operators (See FIG. 1) and is therefore functionally coupled to the input of the data operators. The Mask/MUX selector 800 receives the read value 810 as one of its inputs and a second input 820 and third input 830 from a data feed(s). There is a Mask/MUX operator 850, which may be a set of logic gates, a software Mask/MUX function, or the like or combinations thereof. Such may include one or more multiplexers/data selectors.

The illustrated Mask/MUX operator is referred to as a selector because the bit values of the read value from the looped array act as a "selector" to select whether the resulting bit value will be chosen from the first input (Data0) from the data feed or the second input (Data1) from the data feed. Where the bit value of the read value is a 0, then whatever value is in the corresponding Data0 will be the output value with the bit value within the Data1 being ignored and not used. Where the bit value of the read value is a 1, then whatever value is in the corresponding Data1 will be the output value with the bit value within the Data0 being ignored and not used. Such may be implanted in hardware as a switching gate (or array of many switching gates) that switches between the input lines of Data and Data1 based on the 0/1 bit value of the read value.

The Mask/MUX operator 850 may include a plurality of sets of logic gates that are able to each perform an Mask/MUX operation on a single bit, but together are able to perform a Mask/MUX operation on many or all of the bits of the read value 810 simultaneously. The output 840 of the Mask/MUX operator 850 is functionally coupled to the output of the data operators so that the same may be provided as desired to one or more DRNUS (See FIG. 1).

Figure 9:
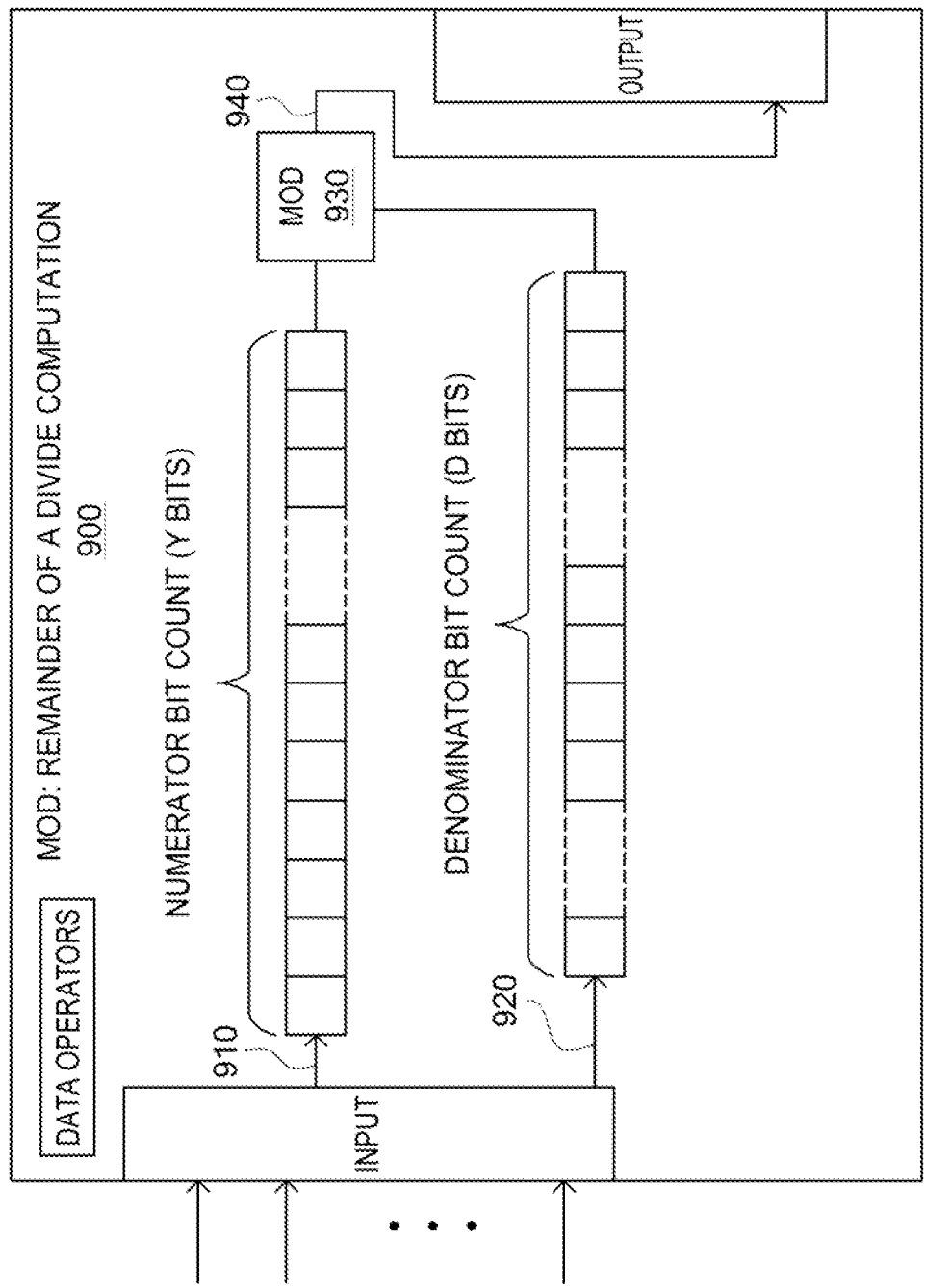
FIG. 9 illustrates implementation of a MOD decoupling operation within a computerized system for efficiently generating random numbers, according to one embodiment of the invention.

FIG. 9 illustrates implementation of a MOD decoupling operation within a computerized system for efficiently generating random numbers, according to one embodiment of the invention. The illustrated MOD decoupling operation 900 is shown as the/an active operator selected from an operator library of a data operators (See FIG. 1) and is therefore functionally coupled to the input of the data operators. The MOD decoupling operation 900 receives the read value 910 as one of its inputs and a second input 920 from a data feed. There is a MOD operator 930, which may be a CPU, SoC, GPU, or other computational integrated circuit, a set of logic gates, a software MOD function, or the like or combinations thereof. Where the MOD operator is not able to perform the mod operation in a single system clock cycle, the CPU may put on hold one or more other components of the system until the MOD operator has completed its operation and produced an output.

The MOD operator 930 generally includes programming/circuitry that performs the following operations to output a modulo:
Determine a numerator
Determine a denominator
Divide the numerator by the denominator, rounding down, thereby determining a quotient
Multiply the denominator by the quotient, thereby determining a product
Subtracting the product from the numerator, thereby determining a modulo There are specialized techniques for producing modulo using other operations, which may be used, where their associated limiting conditions are met within the context of the system (e.g. numerators or denominators of particular types/sizes/relationships). As a non-limiting example, the system may convert the numerator to a difference between a first number that is a round product of the numerator and a second number which must be subtracted from that number for the difference to equal the original numerator. Then the second number may be similarly reduced through addition or subtraction. This may be continued until there is no further reduction possible. The following in a specific example of such operations:

9322=9500−178=9500−190+12≡12(mod95)

In contrast to the XOR and Mask/MUX operators, the MOD operation is not performed as a single bit-parallel operation on a width of bits, but instead there is generally a sequence of operations that are performed in a particular order. This means that to produce output values at system clock speed the MOD operator needs to operate at a clock cycle that is faster than the system clock, or the CPU needs to hold the system clock to wait for the MOD operator to finish.

In operation of a MOD operation, entire value of the read value 910 is utilized as a numerator in a mathematical division operation with a second value 920 as the denominator. The output is the remainder of such a division while the quotient is generally not used at all and often is not even determined. As the remainder is not divisible by the denominator, 900 it must therefore have the same or fewer bits in length as the denominator (D bits) and therefore the choice of size of the denominator controls the output bit length and range of possible values of the output. Also, for the output to have similar random quality to the read value, the size of the numerator (Y bits) should be significantly larger than the size of the denominator (D bits), i.e. Y>>D. Thus, the value pulled from the data feed is selected by the system to be a value that will produce output word sizes according to the needs of the associated DRNUS and the read value will be read in a manner to produce a value with sufficient bit length to result in high quality output. The output 940 of the MOD operator 930 is functionally coupled to the output of the data operators so that the same may be provided as desired to one or more DRNUS (See FIG. 1).

Figure 10:
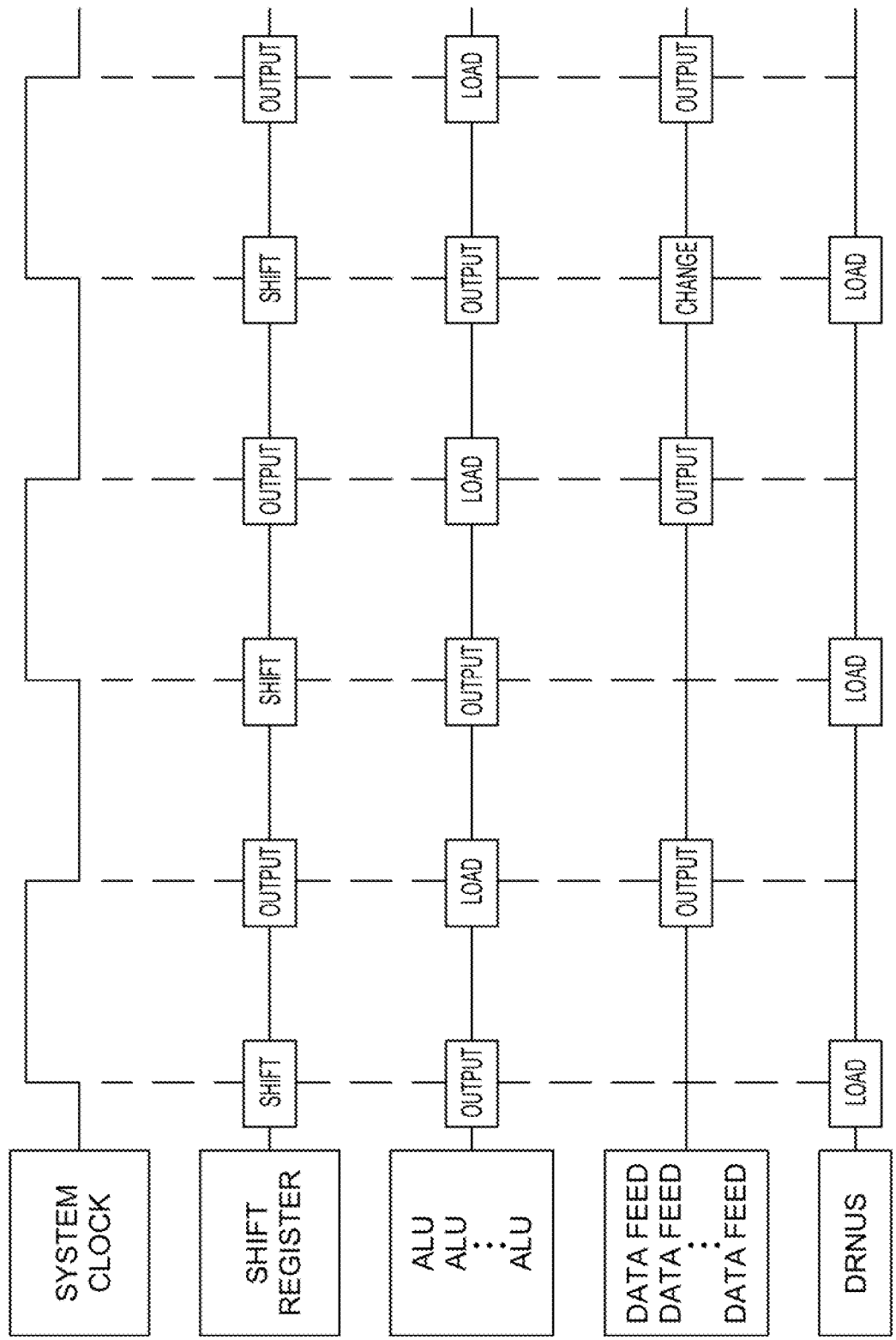
FIG. 10 is a clock diagram showing synchronous operation of components of a computerized system for efficiently generating a stream of random numbers, according to one embodiment of the invention.

FIG. 10 is a clock diagram showing synchronous operation of components of a computerized system for efficiently generating a stream of random numbers, according to one embodiment of the invention. There is shown a system clock pulsing a system clock signal which synchronizes operation of a shift register, one or more arithmetic logic units ($ALU_0$-$ALU_n$), one or more data feeds ($DataFeed_0$-$DataFeed_n$), and a DRNUS which receives the random number stream. The illustrated operation is able to produce random values in a random value stream of a quality substantially equal to the quality of the values used to populate the shift register (which may be a very high quality) at clock speed, which is extremely efficient and can be extremely fast compared to computerized systems of generating random values of similar quality.

The illustrated system clock generates a computerized system's notion of the passage of time and provides a timing structure against which the various components may operate in a synchronous manner. The system clock generates a clock signal and the various components are in functional communication with the clock signal such that they may execute operations together with portions of the clock signal. The illustrated signal is a series of clock cycles (ticks) alternating in a square wave between a first state (e.g. zero) and a second state (e.g. one). The system clock generally includes a clock generator which is generally an electronic oscillator that produces the clock signal. The clock generator is often a quarts piezo-electric oscillator, although alternative generators (e.g. tank circuits, and RC circuits) may be utilized. While a system may have more than one clock and various components may operate according to different clocks (e.g. internal clocks v. system clocks) or multiple versions of the same clock (e.g. using frequency dividers and/or clock multipliers), the illustrated embodiment focuses on a single clock to which the illustrated components are connected.

The illustrated shift register may be any of the types of shift registers described herein and/or may include any of the features, functions, structures, and the like described herein. The shift register is loaded with random values and may include structures that provide further value loading, where appropriate. The illustrated shift register is configured to shift values about the register in relation to an index at the change in clock signal from the first state to the second state and then to output values at the change in clock signal from the second state to the first state. Accordingly, at every cycle, a new set of random values or random value from the shift register is presented to the system.

The illustrated ALUs are functionally coupled to the shift register and to any associated data feeds required for their operation. They are generally combinational digital circuits that perform arithmetic or bitwise operations on integer binary numbers, but may operate on other numbers and/or may perform other operations where context of the system requires. The inputs to the illustrated ALUs are loaded from the output(s) of the shift register and the output(s) of the data feeds. The ALUs then output the resultant values from the operation that the particular ALU is configured to perform (e.g. Mask, XOR, AND, Mod) opposite the output timing of the shift register, i.e. at the change in clock signal from the first state to the second state. Accordingly, when the shift register is outputting, the Alu is loading and when the shift register is shifting, the ALU is outputting. The ALU may be very simple, as in the Mask operation, where the output of the shift register determines which value of two values to output from two separate data feeds and this may be able to be accomplished in a single internal clock cycle. The ALU may be more complex (e.g. Mod) and thus may require its own internal clock that operates at a higher speed than the illustrated system clock in order to be able to output values as illustrated.

The illustrated Data Feeds provide output values needed for the ALUs and thus provide those values at times when the associated ALU is ready to load. The data feeds may be shift registers, DMAs, memory outputs/access, and the like and combinations thereof. While the illustrated Data Feeds are shown to output values once each clock cycle, such rapid delivery of values is not always needed. As an example, where an ALU is performing sequential Mod operations, it may use the same denominator many times (e.g. 100,000+) before a change is needed. However, where the ALU is performing a Mask operation, new Data Feed values from two different Data Feeds will be necessary for each cycle. Accordingly, while the output of the illustrated Data Feeds may be available every clock cycle, it is not necessarily loaded each time. The illustrated Data Feeds include a change operation wherein the output value is changed to a new value. Where a new value is needed each time (e.g. Mask), the change operation happens opposite the output. Where it is not needed for each cycle, the change operation occurs on demand, which may be controlled by a controller.

The illustrated DRNUS loads the output(s) of the ALUs and thereby does so in synchronization with the output timing of the associated ALUs. The illustrated DRNUS is receiving new value(s) at every clock cycle for every ALU to which it is connected. This is useful, as a single system, as illustrated, may be able to produce multiple random values for every clock cycle, wherein multiple ALUs are utilizing the same shift register. Thus random value generation may occur at a rate that outpaces the system clock. Further, wherein shift registers and DMAs are utilized, the encumbrance of the illustrated system on the CPU resources of the computerized system is minimal to nothing and therefore random values may be provided to an application or hardware device (i.e. DRNUS) without causing significant slowdown of the computer system. This means that systems that have great need for random values can receive random values of a known quality essentially "for free."

In operation of the illustrated process, the system clock drives the timing of operation of the illustrated components. As the illustrated clock signal rises, the shift register shifts, and the ALUs output to the DRNUS which receives the output values. As the illustrated clock signal falls, the shift register (and Data Feeds as needed) outputs new values to the ALUs, which ALUs load the needed values to prepare for subsequent operation thereof.

Advantageously, the illustrated system is able to produce a large number of known quality random values for use by one or more DRNUS at system clock speed and without significant impairment or burden on the CPU. This is very different from known methods of generating random values within a computerized system, as such known systems either produce poor/limited quality/quantity of random values, are not able to do so at clock speed, and/or impose significant burdens on the associated CPU or require a separate computing system with a separate CPU to operate.

Figure 11:
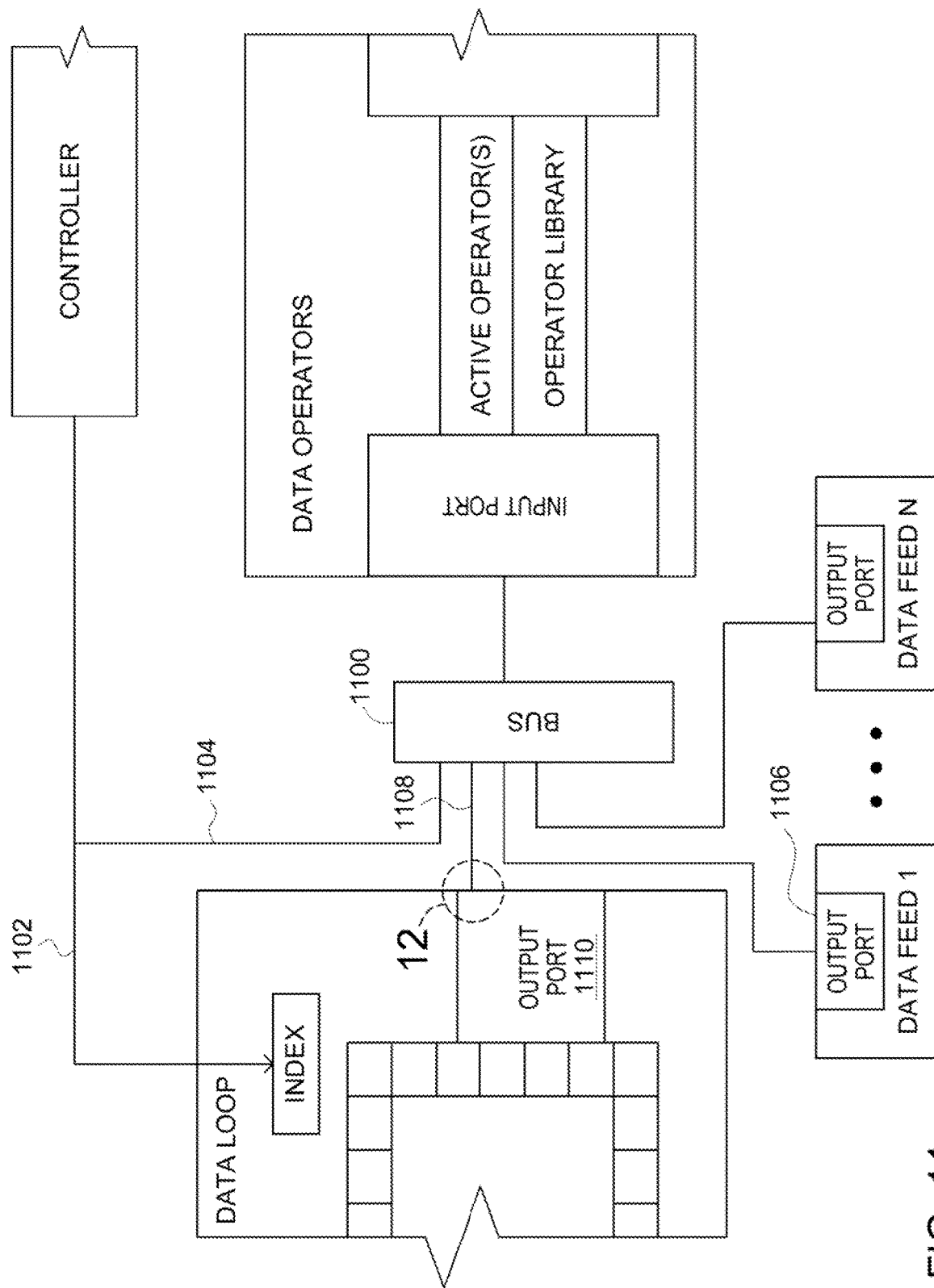
FIG. 11 is a partial view of a computerized system including a data bus for efficiently generating a stream of random numbers, according to one embodiment of the invention.
Figure 12:
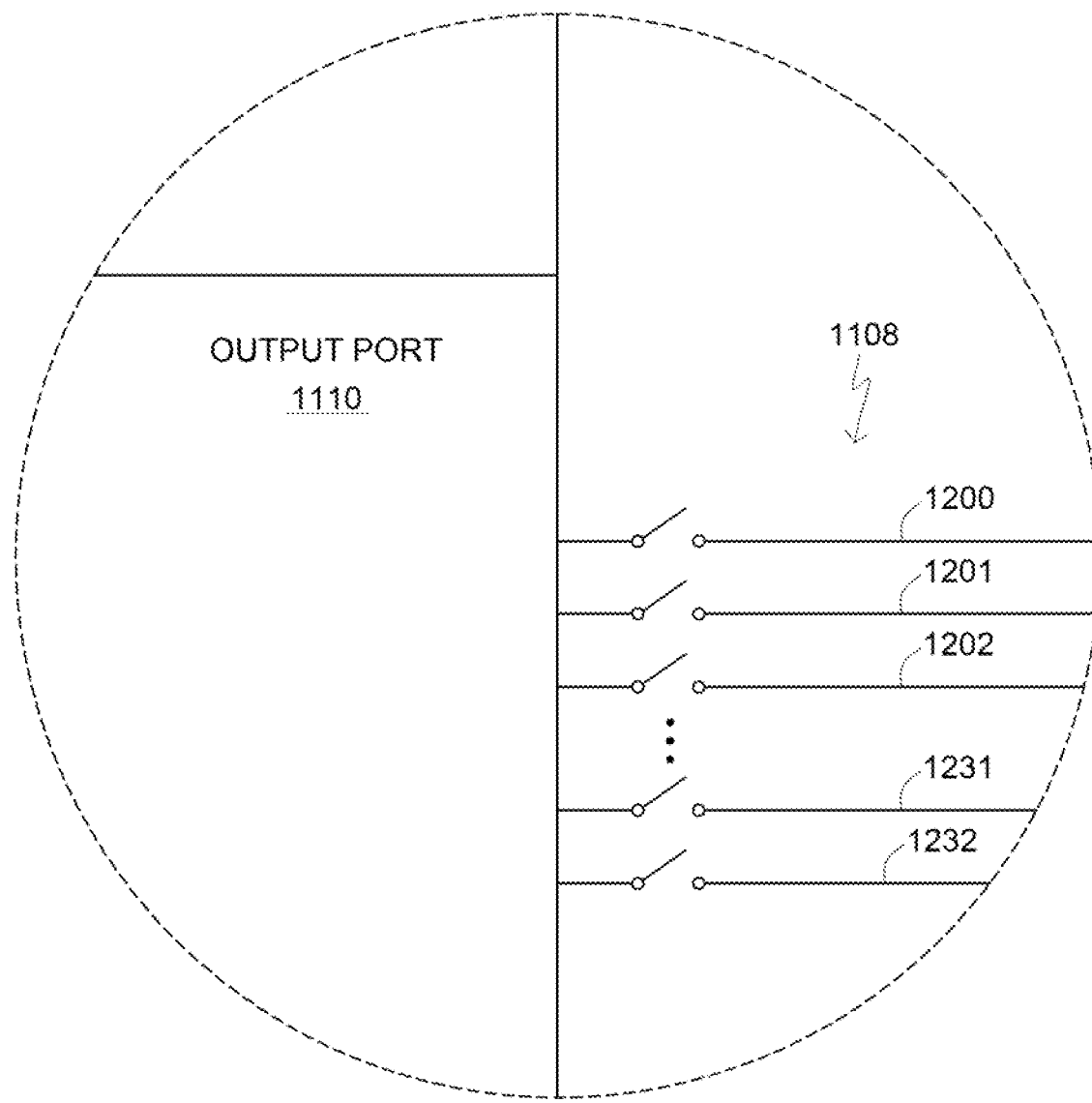
FIG. 12 is a partial view of an output port of the computerized system of FIG. 11, according to one embodiment of the invention.

FIG. 11 is a partial view of a computerized system including a data bus for efficiently generating a stream of random numbers and FIG. 12 is a partial view of an output port of the computerized system of FIG. 11, according to one embodiment of the invention. There is shown a controller, data loop, and plurality of data feeds (1 through N), each in functional communication with a data operators via a data bus 1100 (bus). The illustrated bus 1100 receives input via lines coming into the left side thereof and provides output therefrom out the right-side thereof. As illustrated in the figures herein, lines attached to a left-side of a bus are input lines and lines attached to a right-side thereof are output lines (See FIGS. 13 and 14). As such, illustrated data flows across the bus from left to right. This illustration convention used herein does not negate the understanding that multiplexing busses may be used in various embodiments of the invention, wherein data flows differently than the illustrated left-to-right.

The illustrated controller provides operational control over the various portions of the illustrated system. Such may include one or more features, structures, elements, components, or the like as described herein. The illustrated controller is in direct communication with the index of the data loop via line 1102 and is in indirect communication with the data operator(s) via line 1104 that feeds into the bus. While not illustrated, it may be that the controller is in direct and/or indirect communication with each of the data loop and data feeds 1 through N. Accordingly, the controller may issue commands that activate/deactivate/change operation of the connected modules (i.e. data loop, data feed(s), and data operator(s)).

A controller may issue commands to operational units of a computerized system via such direct and/or indirect communications. Generally, direct lines allow for faster control that does not interrupt operations that occur on clock cycles. However, those direct lines require more circuitry and, generally, more complicated circuit design. Further, those direct lines are generally not "reconfigurable" and so reliance on direct lines can result in hardware setups that cannot be improved later. As shown in the illustrated computerized system, there may be hybrid utilization of direct and indirect control lines.

The illustrated data loop includes a simple-feedback looped array of random data having an index associated therewith at a particular location within the looped array. There is also an output port that delivers values from the looped array. Such data loop may include one or more features, structures, elements, components, or the like as described herein. The output port may include a set of parallel output lines (e.g. in the case of SIPO ports) and those individual output lines may be individually switchable (e.g. bit-masked) so that, selectably, not all of the output bits are provided to the bus. Even where the output is serial, the output line may be selectably switchable such that not all bits in the output series are provided to the bus.

The illustrated output line 1108 of the output port 1110 of the data loop includes a plurality of switchable lines 1200, 1201, 1202 through 1231, 1232. These lines are selectably switchable so that output that would travel over that line may be selectably disabled. This switching may be controllable via commands from the controller and/or by operation of a script, function, etc. It may be that the switching must occur on every clock cycle or it may be that the switches reset after a predefined or predetermined number of clock cycles or it may be that switching persists until changed. The top-most illustrated line 1200 represents bit position 0 of the parallel output of the data loop. The next lines, 1201 and 1202 represent bit positions 1 and 2 of the parallel output of the data loop. The bottom-most lines 1231 and 1232 represent the N−1 and N bit positions of the parallel output of the data loop. Wherein the parallel output of the data loop is a 32 bit output, then the bottom-most lines 1231 and 1232 represent bit positions 31 and 32. As illustrated each and every of the individual output lines of the output of the data loop are switchable. As used herein the term "bit-masked" or "bit-masking" when used in association with parallel output lines represents the ability to selectably switch on-off output lines of a parallel, whether or not that is accomplished by sending a command signal that uses bits to determine which bit values are switched off (i.e. "masked") and on.

The illustrated data feeds provide values to the data operators for use thereby in the manipulation of values from the data loop. Such data feed may include one or more features, structures, elements, components, or the like as described herein. The data feeds may be other data loops which may be similar to the illustrated data loop, may be pseudo-random number generators, may be data pools, outputs of data operators, and combinations thereof and etc. The illustrated data feeds each include an output port 1106, similar to that of the output port of the data loop and which may have structure similar thereto. Accordingly. The output of the data feeds may be bit-masked or otherwise provided in-part to the bus, instead of being provided as a full set of bits.

The illustrated data operators manipulate the output of the data loop and are functionally coupled to the output port thereof via the bus 1100. Such data operators may include one or more features, structures, elements, components, or the like as described herein. The data operators receive data from the bus via the input port of the data operators and then operate on that data using the active operator(s) from the operator library. It may be that the controller issues commands (through the line 1104 to bus 1100) to the data operators from time to time to change which operator(s) are active and thereby changing the manipulation of the data from the data loop. It may also be that the input port is a parallel port and it may be configured and/or in communication with the active operator(s) in a manner to treat different bit positions in different manners (e.g. bits 0 through 31 are the value to be manipulated and bits 32 through 63 are values to be used by the active operator in the manipulation thereof).

The illustrated bus 1100 is a communication system that transfers data between components of the computerized system. The bus may include one or more hardware components that transfer data, such as but not limited to wires, optical fibers, and registers. Further, the illustrated bus may include a plurality of bus systems, such as but not limited to a bus controller, channel controller, memory, I/O controllers, control bus, address, bus, and/or a data bus. The illustrated bus receives parallel data input from active outputs of coupled modules and then provides parallel data output to connected modules (e.g. the illustrated data operators).

Where input data is simultaneously incoming from multiple sources of random data that input data may be bit-masked in order to allow for the aggregation of random data across a single bus. As an example, wherein the output port of the data loop provides 32 parallel bits of random data which may be bit-masked and the output port of data feed 1 provides 32 parallel bits of random data which may be bit-masked, the bus may receive an aggregation of random data from both sources at the same time as a single 32 bit value that gets passed on to the data operators. As a non-limiting example, the first 16 bits of a 32 bit value from the data loop may be concatenated with the last 16 bits from a 32 bit value from the data feed 1, thereby producing a single 32 bit value that includes random bit values from both sources. Such may be accomplished by switching the last 16 lines of the output port of the data loop off while also switching off the first 16 lines of the output port of the data feed 1.

Figure 13:
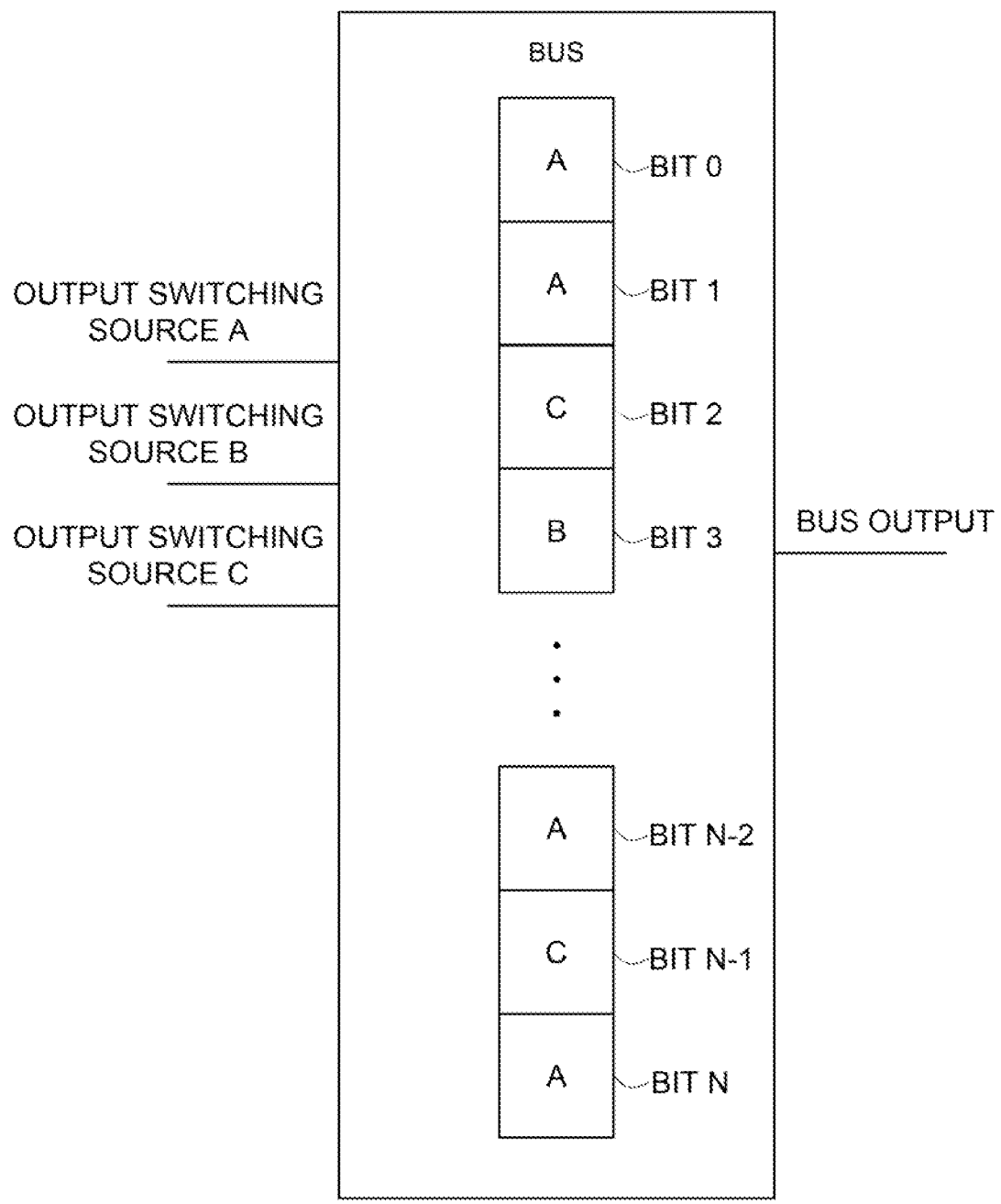
FIG. 13 is a symbolic operational view of a data bus of a computerized system for generating random numbers, according to one embodiment of the invention.

FIG. 13 is a symbolic operational view of a data bus of a computerized system for generating random numbers, according to one embodiment of the invention. There is shown a bus having a plurality of output switching inputs (i.e. Source A, Source B, and Source C) an N-bit wide bit register (illustrated as a 1-bit deep register) and a bus output. The illustrated bus allows for the aggregation of data from a plurality of sources, e.g. aggregating random data from sources of random data.

The 1-bit deep register of the illustrated bus is shown for the purpose of showing the data passed by the bus on a particular clock cycle and is not intended to be limiting. It is understood that a bus will generally not include a register of any width or depth and therefore there are many embodiments without any register in the bus. The illustrated register includes a plurality of bit positions, i.e. bit 0, bit 1, bit 2, bit 3, through to bit N, bit N−1, and bit N−2. Where the register is 32 bits wide, then bit N would be bit 31, bit N−1 would be bit 30, and bit N−2 would be bit 29.

The letters (A, B, C) shown within the various bit positions are representative of the source of the values that would be present within those bit positions at a particular time and not representative of actual values. As an example, in a binary computing system, the values in each bit position would be 0 or 1. In the illustrated example, Output switching Source A has its own output bit positions for bit 0, bit 1, and bit N switched on with the bit positions for bit 2, bit 3, bit N−2, and bit N−1 switched off. Accordingly, only values in the bit positions where the output is switched on are able to pass to the bus. This may be represented by a masking value of (1 1 0 0 . . . 0 0 1), wherein 1 corresponds to ON and 0 corresponds to OFF.

It may be that such a masking value was passed by a controller to Source A or it may be that over time control signals were sent to Source A that resulted in a masking effect that matches the masking value. Similarly, Source B's contribution to the aggregate value in the register may be represented by a masking value of (0 0 0 1 . . . 1 0 0) and Source C's contribution may be represented by a masking value of (0 0 1 0 . . . 0 1 0). To be clear, the masking value is not the actual value in the register. As an example, the value in the register could be any value at all, including but not limited to (1 1 1 1 . . . 1 1 1) or (0 0 0 0 . . . 0 0 0) or any variation therebetween, the mask values merely represent which output lines of each source are switched on/off and thereby are able/unable to contribute to the aggregate value that the bus passes as output to whatever module(s) are active and receiving such output.

Figure 14:
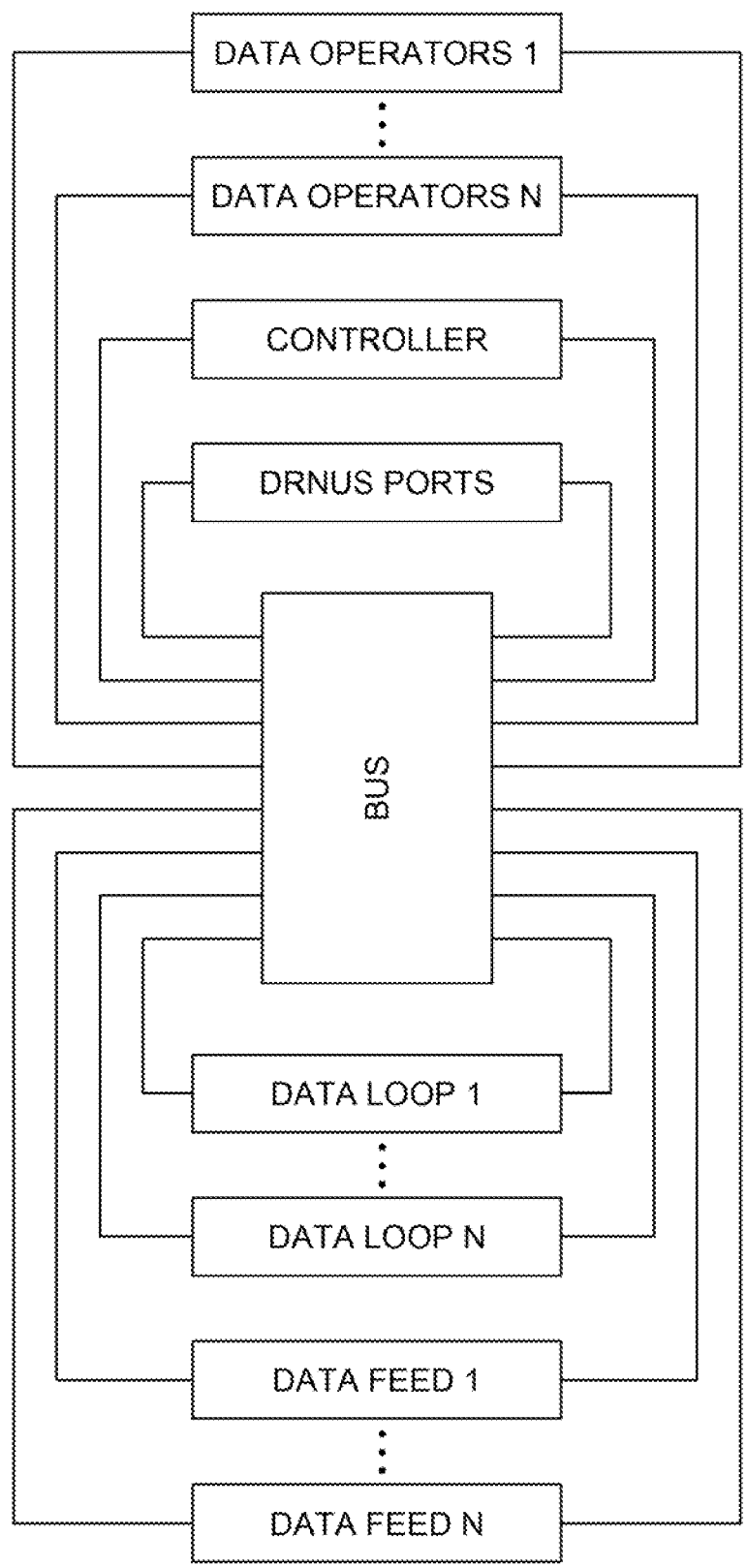
FIG. 14 is a schematic view of a highly-configurable computerized system for efficiently generating a stream of random numbers, according to one embodiment of the invention.

FIG. 14 is a schematic view of a highly-configurable computerized system for efficiently generating a stream of random numbers, according to one embodiment of the invention. The illustrated bus is connected via both input (incoming lines on the left-side thereof) and output (outgoing lines from the right-side thereof) to each of a controller, DRNUS ports, Data Operators 1 through N. Data Loop 1 through N, and Data Feed 1 through N. Accordingly, depending on which modules are active (e.g. via control signals from the controller) and how the individual output lines of parallel output lines of each module are switched on/off the system may manipulate data in near-infinite plethoric ways. Wherein the status of particular modules may be changed via control signals, the structure of data manipulation may be changed in real-time.

As a non-limiting example, the illustrated computerized system may activate Data Feed 1 and Data Feed 2, with the first half of the output lines of Data Feed 1 switched off and the second half of the output lines of Data Feed 2 switched off while the input of Data Loop 1 is activated and all other modules being inactive in the system. Such a configuration concatenates the second half of each output of Data Feed 1 with the first half of the output of Data Feed 2 ("dropping") the remaining bits "on the floor") and loads those values into Data Loop 1. Where the values from Data Feed 1 and Data Feed 2 are random values, Data Loop 1 is therefore loaded with random values that are aggregated from Data Feed 1 and 2. Alternatively, the computerized system may utilize activate the output lines of Data Feeds 1 and 2 in modes different from those just described to perform other forms of aggregation, including but not limited to other forms of concatenation, bit selection, and dynamic mixing of N Data Feeds.

Once enough clock cycles have passed to complete loading Data Loop 1, the illustrated controller may deactivate Data Feeds 1 and 2 and the input for Data Loop 1 and activate the output for Data Loop 1 and Data Feeds 3 and 4 and the input for Data Operators 1, selecting a MOD operator therefrom. The output lines of Data Loop 1 and Data Feed 3 may be switched on in a bit-position configuration on the bus such that the values therefrom are aggregated into a numerator of the MOD operation and the output lines of Data Feed 4 are switched on in a manner to provide a denominator of a desired bit width. It may be that Data Feed 4 is then deactivated such that it does not continue to provide new values, but instead holds the same value over many clock cycles, while Data Loop 1 and Data Feed 3 continue to provide and thereby aggregate new values each clock cycle. It may be that the system alternates this configuration with a configuration that activates the output of Data Operators 1 and the input of both DRNUS Ports and Data Loop 2 with all other modules disabled. Accordingly, such a system would feed values needed to produce new values into Data Operators 1 and then the output of Data Operators 1 would be fed to each of the DRNUS (via the DRNUS ports) and be loaded into Data Loop 2.

Such a system initially loaded with only a pair of Data Feeds could load an unlimited number of Data Loops and provide an unlimited source of values to any number of DRNUS. Further, the same system would not produce the same values unless it were configured in exactly the same manner. Thus, such a system could be mass produced, yet configured in a manner that allows for diverse value production that is repeatable between systems, if they are configured in the same manner. Where the data feeds and/or data loops of two different computerized systems have the same values and are configured in the same manner, they can produce the same output values.

Further, wherein the initialized data feeds are random values of a particular quality, the systems may be configured to load identical (to each other, across the two identically configured systems) data loops with unlimited random values of the same quality, which may then be utilized to very efficiently produce more unlimited values of the same quality (again, identical to each other across the two systems that are identically configured). However, a third party system having the exact same initialized Data Feeds, without knowledge of the configuration of the other systems (including the output masking and random value aggregation patterns), would be unable to duplicate the same random value output stream.

Thus, such a computerized system may be mass produced in hardware and widely distributed with the initial data feeds being known to any and all parties. Yet these same systems will be capable of producing random value streams that are unpredictable where configuration details are unknown and highly reliably duplicatable (while still being random) where configuration details are known. Such a computerized system may be advantageously utilized in essentially all circumstances where random values are useful and may be configured to quickly and efficiently produce such values in sufficient quantity and quality as appropriate to the circumstances of use without significantly interrupting clock cycles of the associated systems.

It may be that the computerized system includes a process for resetting aggregation masks and/or other configuration characteristics of the computerize system, which may include one or more of the following steps:

A control component identifies that it is time to reset an aggregation mask

The control component, using a random value stream, dynamically selects a new characteristic(s) for an aggregation mask (e.g. runtime duration of mask, specific bit selection for the mask) or other feature of the computerized system (e.g. MOD numerator and/or denominator values, runtime duration of the MOD numerator/denominator value)

The control component controls the aggregation mask to match with the dynamically selected characteristic(s)

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

The following are non-limiting exemplary statements of embodiments:

1. A method of quickly and efficiently generating a series of random numbers from a source of random numbers in a computing system, comprising the steps of:
   a. loading a data loop with random data from a source of random data, the data loop including:
      i. a looped array of stored values; and
      ii. an index;
   b. reading a multi-bit value from the data loop in relation to a location of the index within the looped array;
   c. performing a first data operation on the multi-bit value thereby deriving a derived random number from the multi-bit value;
   d. moving the index in relation to the looped array to a different location within the looped array;
   e. repeating steps b-d, thereby generating a series of derived random numbers.
2. The method of Statement 1, wherein the data loop is a shift register.
3. The method of Statement 2, wherein the shift register is a universal shift register.
4. The method of any of Statements 1-15, wherein the different location is an adjacent location.
5. The method of any of Statements 1-15, wherein the data operation is a decoupling operation selected from the group consisting of: XOR, Mask Generator, Data MUX, and MOD.
6. The method of any of Statements 1-15, wherein the source of random data is the output of a method according to Statement 1.
7. The method of any of Statements 1-15, wherein the step of loading the data loop is performed by a direct memory access.
8. The method of any of Statements 1-15, further comprising a step of, contemporaneously with the step of performing a first data operation, performing a second data operation on the multi-bit value thereby deriving a second derived random number from the multi-bit value.
9. The method of any of Statements 1-15, wherein a second computing system independently performs the steps of Statement 1 using a substantially identical source of random data such that the data loop of the second computing system loads identically to the data loop of Statement 1 and substantially identical data operation such that resulting derived random numbers are the same as those of Statement 1, thereby generating a second series of derived random numbers that is identical to the series of derived random numbers of Statement 1.
10. The method of Statement 9, wherein the second computing system is structurally different from the computing system of Statement 1 in at least one of type of: data loop, read operator, shifter, controller type, and data loop loader.
11. The method of any of Statements 1-15, wherein the data operation is a MOD operation performed with the multi-bit value as the numerator and a denominator having fewer bits than the multi-bit value.
12. The method of Statement 11, wherein the denominator is a value obtained from, directly or derived, from the source of random data.

13. The method of Statement 11, wherein the denominator is larger than a desired range of the derived random number.
14. The method of any of Statements 1-15, further comprising a step of automatically selecting the decoupling operation from a plurality of decoupling operations according to a controller.
15. The method of Statement 14, wherein the controller includes one or more of: a programmable logic circuit, a script, and a driver.
16. A computerized system for efficiently generating a stream of random numbers, comprising:
   a. a data loop, including:
      i. a simple-feedback looped array of random data;
      ii. an index; and
      iii. an output port that reads values from the simple-feedback looped array based on a relative location of the index with respect to the simple-feedback looped array;
   b. a data operator, having:
      i. an input; and
      ii. and output that provides access to output values from the data operator; wherein the data operator is functionally coupled to the output port such that values from the output port are fed as input values into the data operator; and
   c. an incrementor functionally coupled to the data loop that shifts the index relative to the simple-feedback looped array.
17. The system of any of Statements 16-23, wherein the data loop further includes an input port.
18. The system of any of Statements 16-23, wherein values from the output port are multibit values.
19. The system of any of Statements 16-23, wherein the data loop is a universal shift register.
20. The system of any of Statements 16-23, wherein the data loop is a shift register.
21. The system of any of Statements 16-23, wherein the data operator is a decoupling operation selected from the group consisting of: XOR, Mask Generator, Data MUX, and MOD.
22. The system of any of Statements 16-23, further comprising a second data loop having an input port functionally coupled to the output of the data operator such that output values from the data operator are input into the second data loop.
23. The system of any of Statements 16-23, further comprising a source of random data functionally coupled to the input port of the data loop, such that the looped array of random data is fed data from the source of random data.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:
1. A computerized system for efficiently generating a stream of random numbers, comprising
   a. a data bus, having:
      i. a bus input with a first output switching input and a second output switching input, wherein the first output switching input masks values input thereto and the second output switching input masks values input thereto such that data from both the first and second output switching inputs are aggregated into the data bus according to the masking thereof; and
      ii. a bus output;
   b. a data loop of random numbers having a data loop output port functionally coupled to the bus input through the first output switching input;
   c. a first data feed having a first data feed output functionally coupled to the bus input through the second output switching input; and
   d. an active data operator functionally coupled to the bus output such that data aggregated by the data bus from the data loop of random numbers and the first data feed is fed to the active data operator, the active data operator having an output being a stream of random numbers.
2. The computerized system of claim 1, further comprising a controller functionally coupled to at least one of the bus input, the data loop of random numbers, and the active data operator and configured to control an operational parameter of the same.
3. The computerized system of claim 1, further comprising a data operators system including an operator library functionally coupled to the bus output, wherein the active data operator is an activated data operator from the operator library.
4. The computerized system of claim 1, wherein at least one of the first and second output switching inputs is a dynamic output switching input such that the mask applied thereby is selectably changeable.
5. The computerized system of claim 1, wherein the active data operator is a null operation that makes no changes to the aggregated data.
6. The computerized system of claim 1, further comprising a second data feed having a second data feed output functionally coupled to the bus input through a third output switching input thereof.
7. The computerized system of claim 1, wherein the first data feed is an information stream.
8. The computerized system of claim 1, wherein the first data feed is a data loop.
9. A computerized system for aggregating data, comprising
   a. a data bus, having:
      i. a bus input with a first output switching input and a second output switching input, wherein the first output switching input masks values input thereto and the second output switching input masks values input thereto such that data from both the first and second output switching inputs are aggregated into the data bus according to the masking thereof; and
      ii. a bus output that outputs aggregated data;
   b. a first data feed functionally coupled to the bus input through the first output switching input; and
   c. a second data feed functionally coupled to the bus input through the second output switching input.
10. The computerized system of claim 9, further comprising a controller functionally coupled to at least one of the bus input, the data loop of random numbers, and an active data operator and the controller is configured to control an operational parameter of the same.
11. The computerized system of claim 9, further comprising an active data operator functionally coupled to the bus output such that data aggregated by the bus output from the data loop of random numbers and the first data feed is fed to the active data operator.

12. The computerized system of claim 11, further comprising a data operators system including an operator library functionally coupled to the bus output, wherein the active data operator is an activated data operator from the operator library.

13. The computerized system of claim 9, wherein at least one of the first and second output switching inputs is a dynamic output switching input such that the mask applied thereby is selectably changeable.

14. The computerized system of claim 9, wherein the first data feed is a data loop of random numbers.

15. The computerized system of claim 9, wherein the first data feed is an information stream.

16. The computerized system of claim 9, further comprising a third data feed having a third data feed output functionally coupled to the bus input through a third output switching input thereof.

17. A method of aggregating data within a computerized system, comprising the steps of:

a. receiving a first stream of data into a first output switching input of a bus;
   b. receiving a second stream of data into a second output switching input of the bus; and
   c. passing an aggregate data stream through the bus by operation of masking of the first stream of data and the second stream of data via the first and second output switching inputs to an output of the bus, the aggregate data stream including data from both the first stream of data and the second stream of data.

18. The method of claim 17, further comprising the step of selectably changing a mask of the first output switching input by operation of a controller functionally coupled to the bus.

19. The method of claim 17, wherein at least one of the output switching inputs includes a dynamic output switching input.

20. The method of claim 17, further comprising operating on the aggregated data stream by operation of an active data operator functionally coupled to the output of the bus.

\* \* \* \* \*